12) United States Patent
Kyuma

(10) Patent No.: US 10,350,491 B2
(45) Date of Patent: Jul. 16, 2019

(54) TECHNIQUES FOR VARIABLE VIBRATION WAVEFORM GENERATION BASED ON NUMBER OF CONTROLLERS

(71) Applicant: NINTENDO CO., LTD., Kyoto (JP)

(72) Inventor: Koichi Kyuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 226 days.

(21) Appl. No.: 15/616,100

(22) Filed: Jun. 7, 2017

(65) Prior Publication Data

US 2018/0178118 A1 Jun. 28, 2018

(30) Foreign Application Priority Data

Dec. 27, 2016 (JP) .................................. 2016-252315
Jan. 10, 2017 (JP) .................................. 2017-001840

(51) Int. Cl.
*A63F 13/285* (2014.01)
*G06F 3/01* (2006.01)
(Continued)

(52) U.S. Cl.
CPC ............ *A63F 13/285* (2014.09); *A63F 13/23* (2014.09); *A63F 13/235* (2014.09); *A63F 13/24* (2014.09);
(Continued)

(58) Field of Classification Search
CPC ...... A63F 13/285; A63F 13/23; A63F 13/235; A63F 13/24; A63F 2300/1037; A63F 13/26; G06F 3/06
See application file for complete search history.

(56) References Cited

U.S. PATENT DOCUMENTS

2003/0090460 A1 5/2003 Schena
2006/0046843 A1 3/2006 Nakajima
(Continued)

FOREIGN PATENT DOCUMENTS

EP 1 057 504 12/2000
JP 2006-068210 3/2006
(Continued)

OTHER PUBLICATIONS

Extended European Search Report dated Dec. 12, 2017 issued in European Application No. 17175003.7 (9 pgs.).
(Continued)

*Primary Examiner* — Jasson H Yoo
(74) *Attorney, Agent, or Firm* — Nixon & Vanderhye PC

(57) ABSTRACT

When a first operation method using a first operation apparatus and a second operation apparatus as a set is set, first vibration data for vibrating a first vibrator and second vibration data for vibrating a second vibrator are generated, and when a second operation method using either of the operation apparatuses is set, third vibration data is generated based on the first vibration data and the second vibration data. Then, when the first operation method is set, the first vibration data is transmitted to the first operation apparatus, and also the second vibration data is transmitted to the second operation apparatus, and when the second operation method is set, the third vibration data is transmitted to either of the operation apparatus for use in the second operation method.

20 Claims, 26 Drawing Sheets

(51) Int. Cl.
*A63F 13/23* (2014.01)
*A63F 13/24* (2014.01)
*A63F 13/235* (2014.01)
*A63F 13/28* (2014.01)

(52) U.S. Cl.
CPC .............. *A63F 13/28* (2014.09); *G06F 3/016* (2013.01); *A63F 2300/1037* (2013.01)

(56) References Cited

U.S. PATENT DOCUMENTS

| | | |
|---|---|---|
| 2006/0290662 A1 | 12/2006 | Houston et al. |
| 2007/0265088 A1 | 11/2007 | Nakada et al. |
| 2007/0285216 A1 | 12/2007 | Tierling |
| 2011/0190058 A1 | 8/2011 | Houston |
| 2011/0248817 A1 | 10/2011 | Houston |
| 2013/0038603 A1 | 2/2013 | Bae |
| 2013/0165226 A1 | 6/2013 | Thorner |
| 2013/0261811 A1 | 10/2013 | Yagi et al. |
| 2013/0281211 A1 | 10/2013 | Yasuda et al. |
| 2013/0281212 A1 | 10/2013 | Tsuchiya et al. |
| 2014/0285453 A1 | 9/2014 | Park |
| 2015/0268722 A1* | 9/2015 | Wang ...................... G06F 3/016 345/156 |
| 2015/0290076 A1 | 10/2015 | Hobbs et al. |
| 2015/0356838 A1 | 12/2015 | Obana et al. |
| 2016/0163165 A1 | 6/2016 | Morrell |
| 2016/0214007 A1 | 7/2016 | Yamashita |
| 2016/0361633 A1* | 12/2016 | Fujita ...................... A63F 13/23 |
| 2016/0367892 A1 | 12/2016 | Otani et al. |
| 2017/0087458 A1 | 3/2017 | Nakagawa |
| 2018/0028910 A1 | 2/2018 | Aoki et al. |
| 2018/0028911 A1 | 2/2018 | Aoki et al. |

FOREIGN PATENT DOCUMENTS

| | | |
|---|---|---|
| JP | 2007-301038 | 11/2007 |
| JP | 2013-236909 | 11/2013 |
| WO | 2012/125924 | 9/2012 |

OTHER PUBLICATIONS

Extended European Search Report dated Feb. 13, 2018 issued in European Application No. 17194859.9 (7 pages).

* cited by examiner

FIG. 12
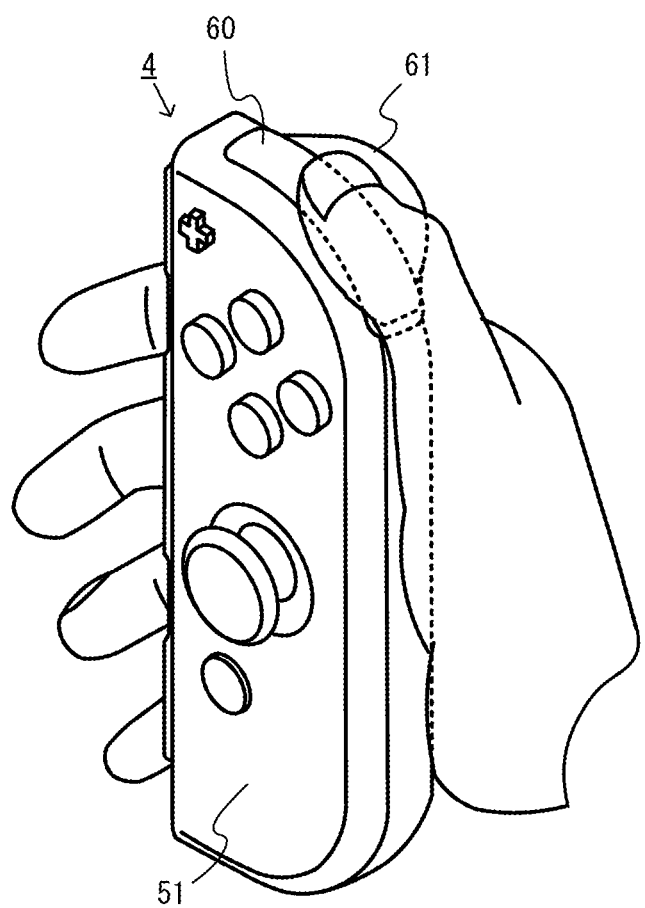
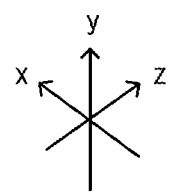

FIG. 14
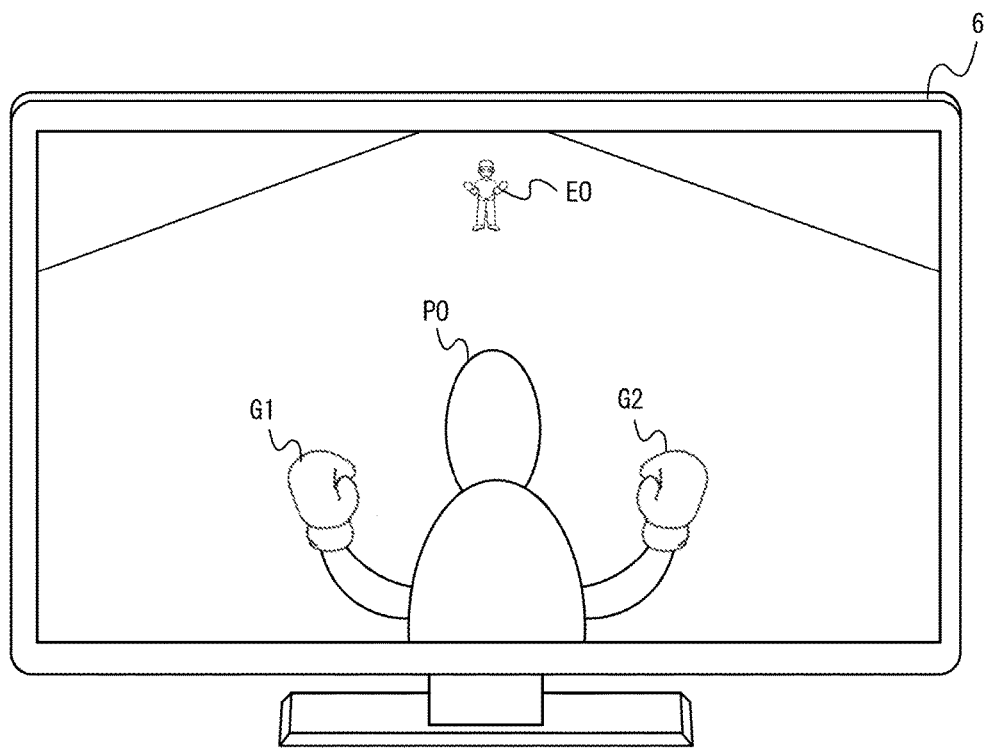
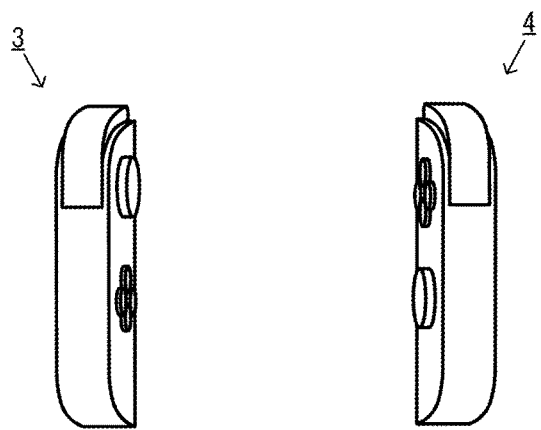

FIG. 15
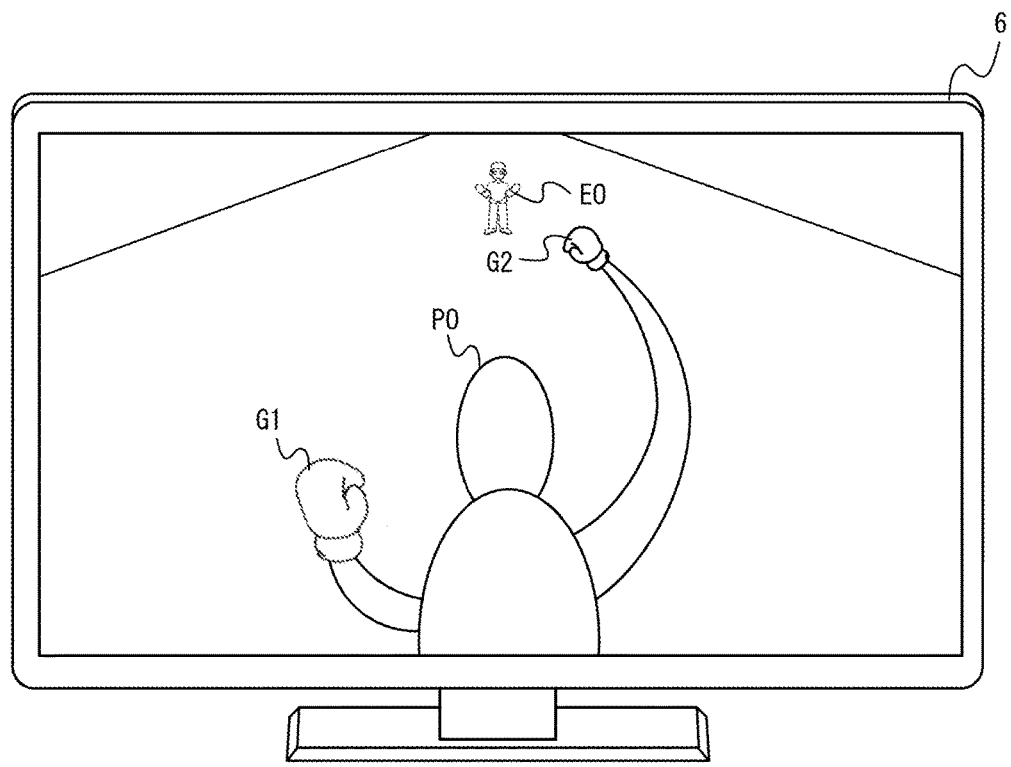
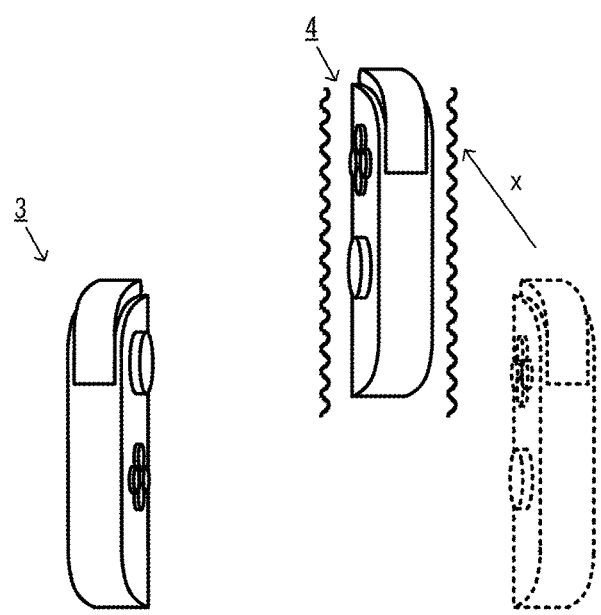

FIG. 16
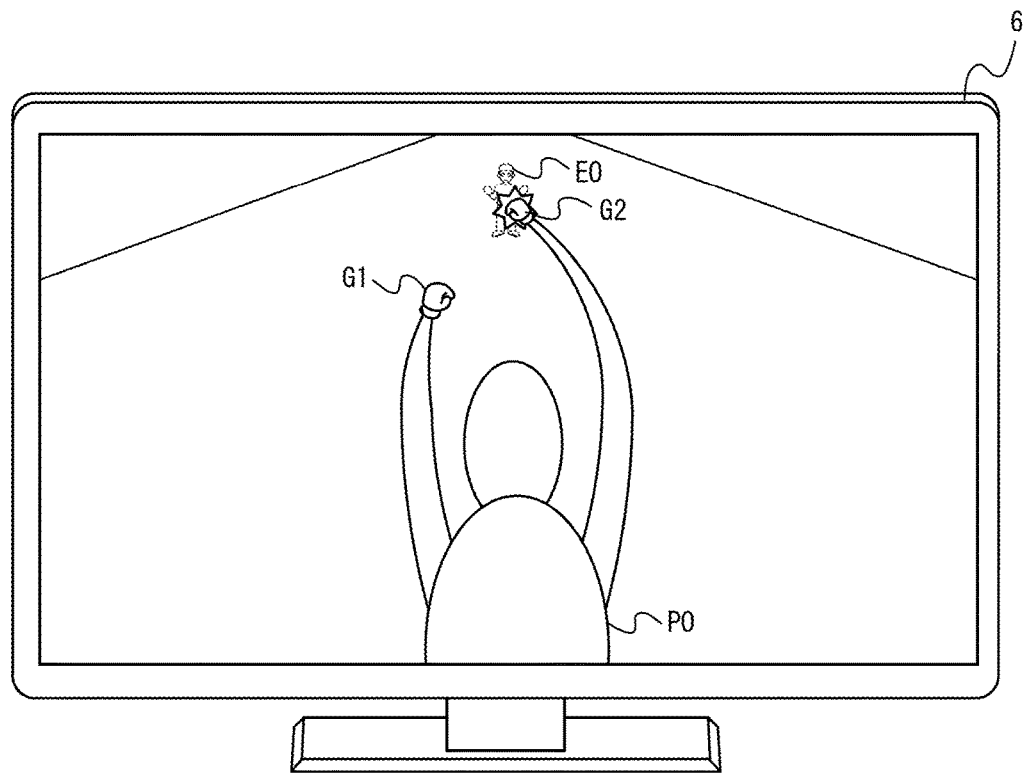
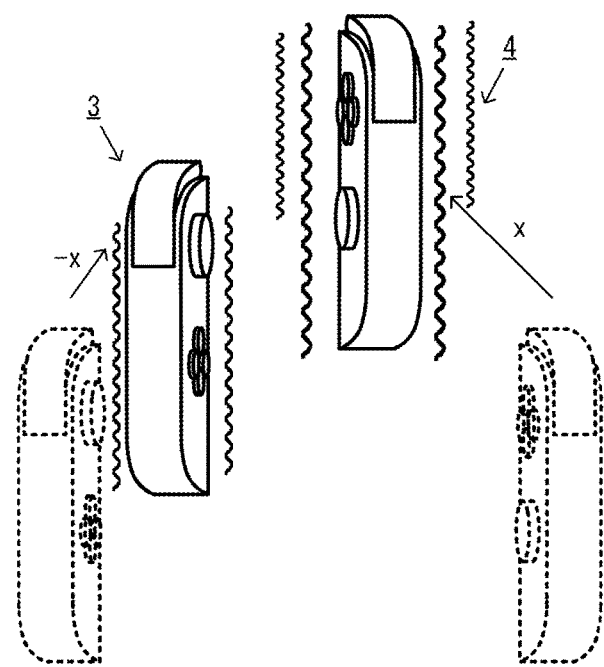

F I G. 1 7
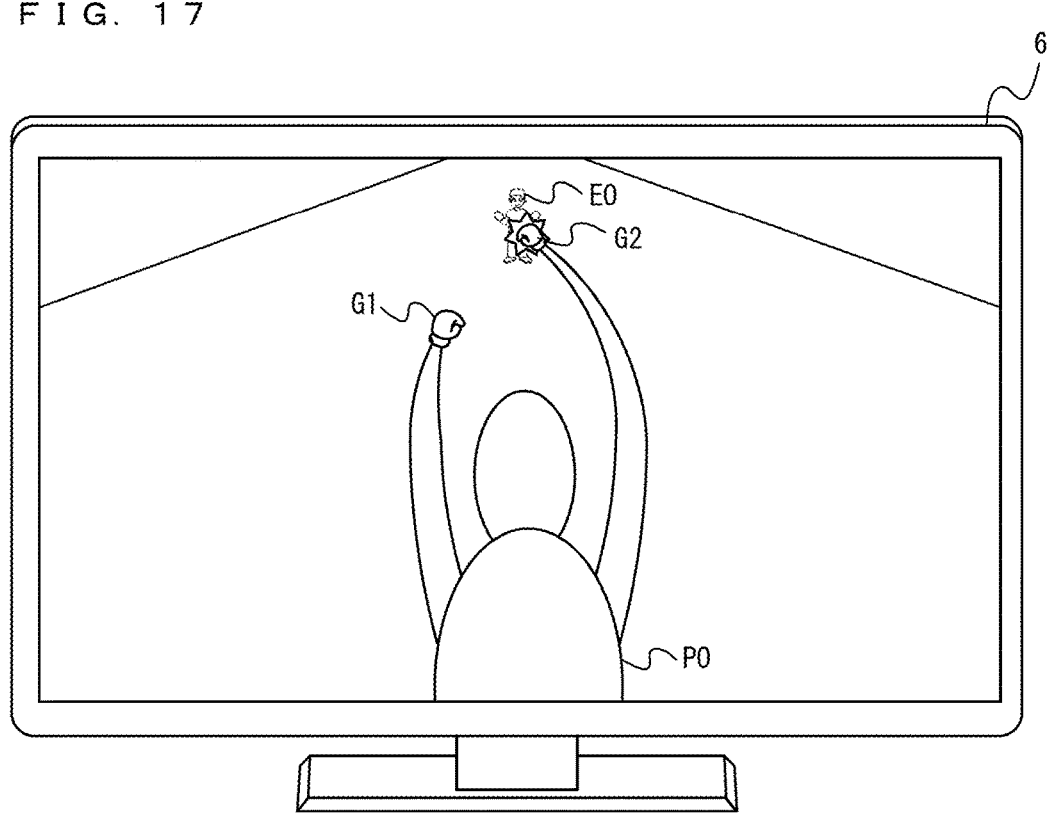
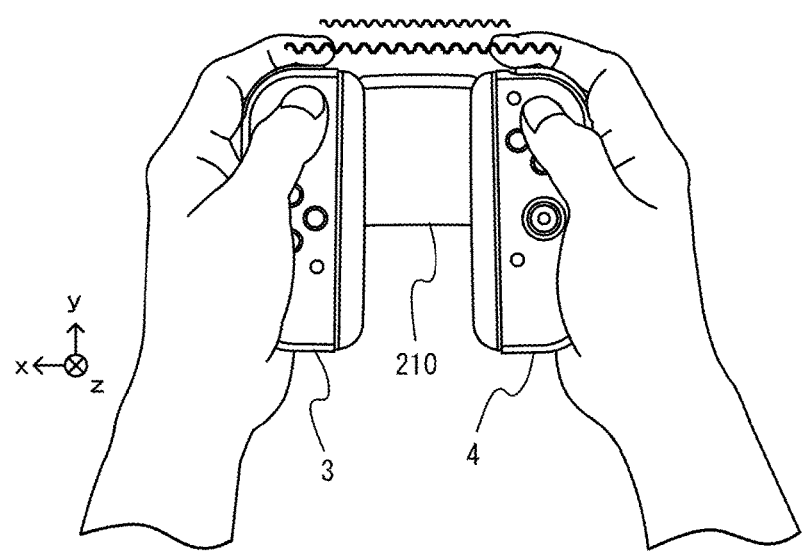

FIG. 18
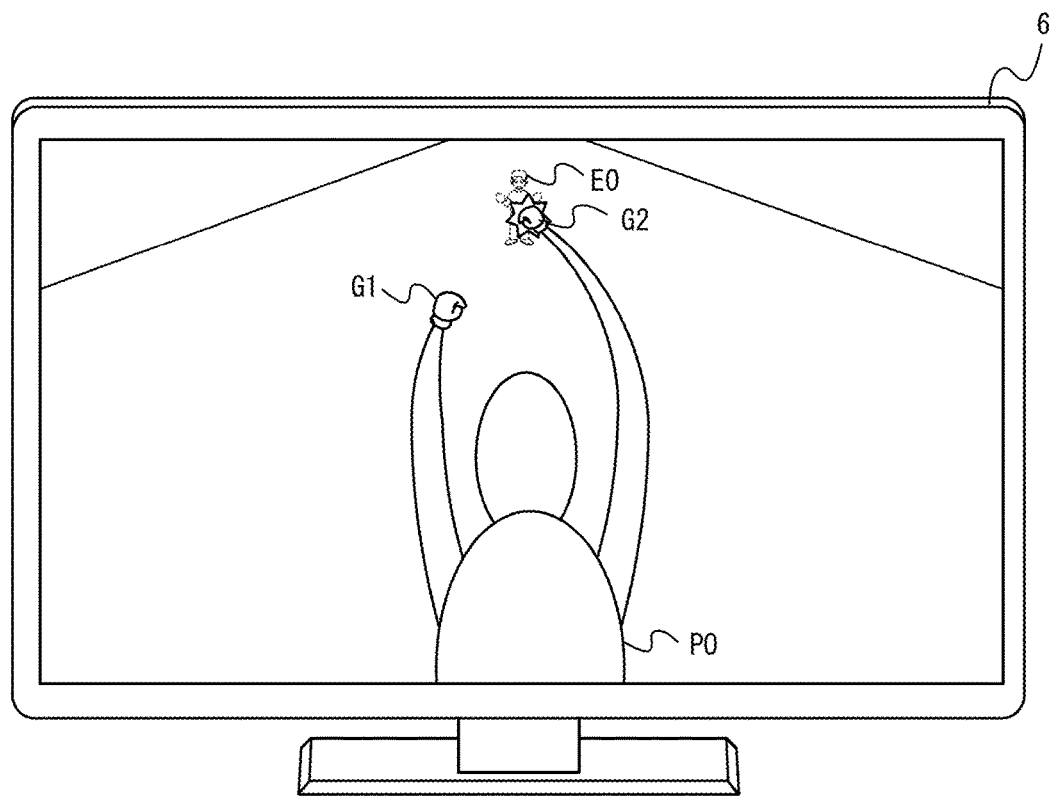
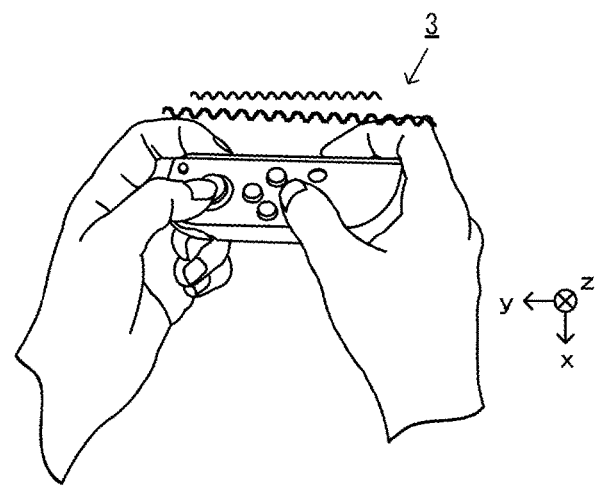

F I G. 19

| | VERTICALLY-HELD OPERATION METHOD (TWO CONTROLLERS) | EXTENSION GRIP OPERATION METHOD (TWO CONTROLLERS) | HORIZONTALLY-HELD OPERATION METHOD (SINGLE CONTROLLER) | |
|---|---|---|---|---|
| | | | LEFT CONTROLLER | RIGHT CONTROLLER |
| MOVE TO LEFT | TILT TO LEFT (BOTH) | TILT STICK 32 IN POSITIVE x-AXIS DIRECTION | TILT STICK 32 IN POSITIVE y-AXIS DIRECTION | TILT STICK 52 IN NEGATIVE y-AXIS DIRECTION |
| MOVE TO RIGHT | TILT TO RIGHT (BOTH) | TILT STICK 32 IN NEGATIVE x-AXIS DIRECTION | TILT STICK 32 IN NEGATIVE y-AXIS DIRECTION | TILT STICK 52 IN POSITIVE y-AXIS DIRECTION |
| MOVE FORWARD | TILT FORWARD (BOTH) | TILT STICK 32 IN POSITIVE y-AXIS DIRECTION | TILT STICK 32 IN NEGATIVE x-AXIS DIRECTION | TILT STICK 52 IN POSITIVE x-AXIS DIRECTION |
| MOVE BACKWARD | TILT BACKWARD (BOTH) | TILT STICK 32 IN NEGATIVE y-AXIS DIRECTION | TILT STICK 32 IN POSITIVE x-AXIS DIRECTION | TILT STICK 52 IN NEGATIVE x-AXIS DIRECTION |
| LEFT PUNCH | SWING (LEFT) | PRESS B-BUTTON 54 | PRESS LEFT DIRECTION BUTTON 36 | PRESS A-BUTTON 53 |
| RIGHT PUNCH | SWING (RIGHT) | PRESS A-BUTTON 53 | PRESS DOWN DIRECTION BUTTON 34 | PRESS X-BUTTON 55 |
| JUMP | PRESS FIRST R-BUTTON 60 | PRESS X-BUTTON 55 | PRESS RIGHT DIRECTION BUTTON 33 | PRESS Y-BUTTON 56 |
| DASH | PRESS FIRST L-BUTTON 38 | PRESS Y-BUTTON 56 | PRESS UP DIRECTION BUTTON 35 | PRESS B-BUTTON 54 |
| HOOK PUNCH | TILT (LEFT OR RIGHT) | TILT STICK 32 | TILT STICK 32 | TILT STICK 52 |
| DEFENSE | TILT INWARD (BOTH) | PUSH IN STICK 32 | PUSH IN STICK 32 | PUSH IN STICK 52 |

F I G. 2 1
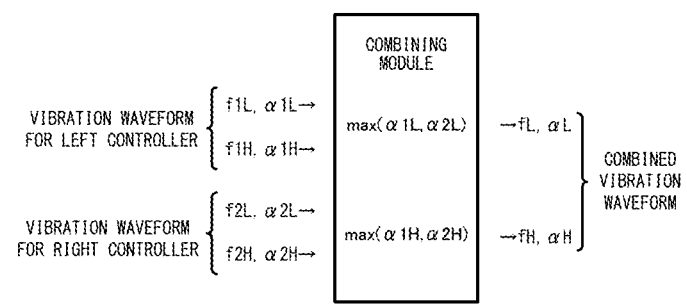

F I G. 2 2
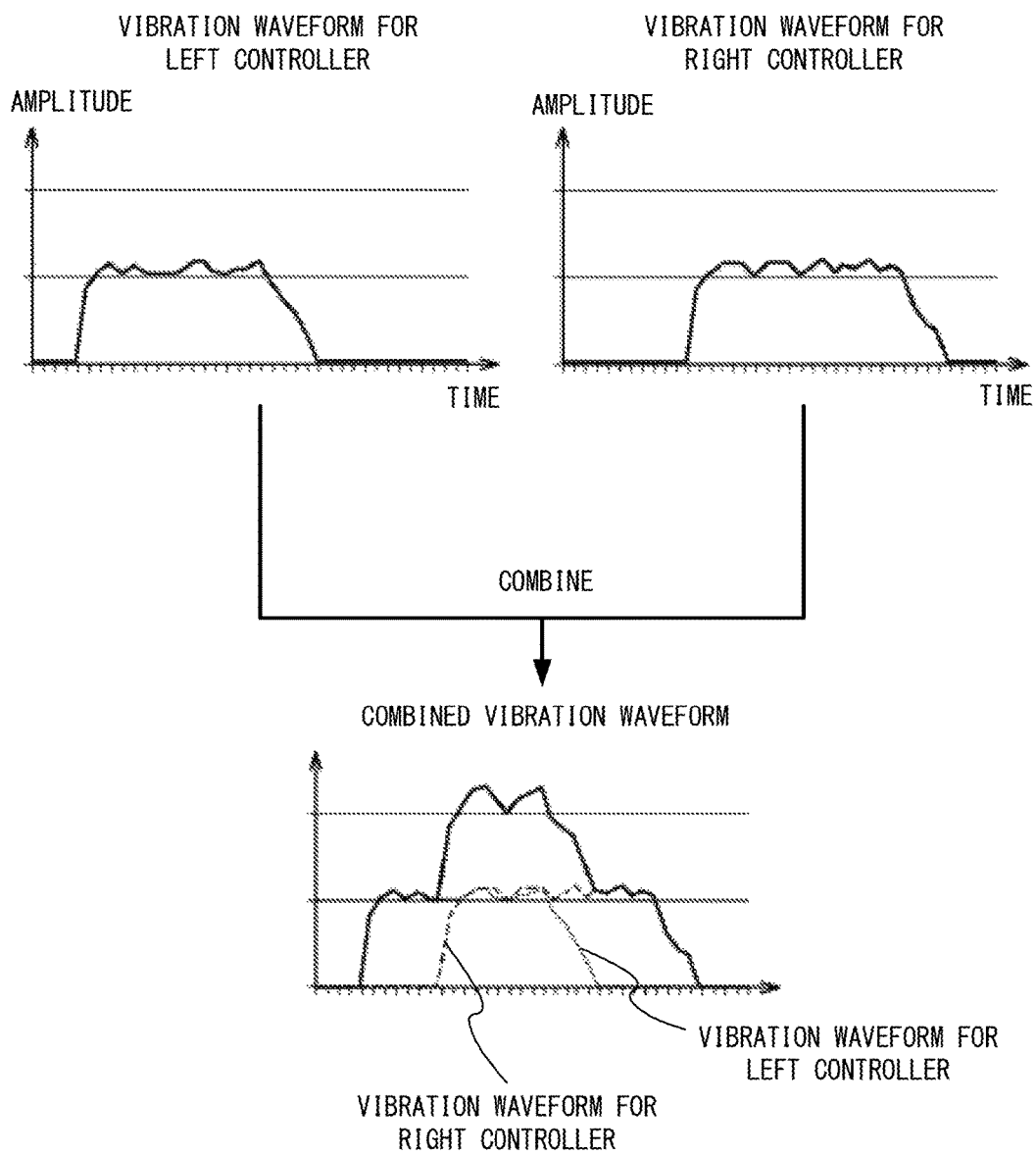

F I G. 23
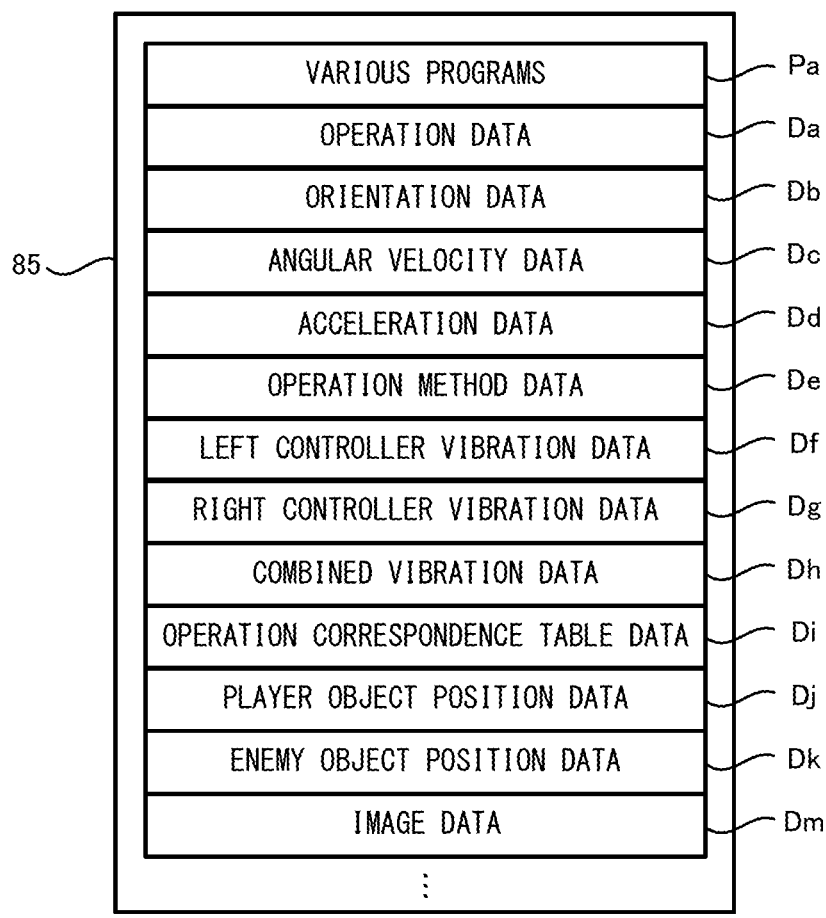

F I G. 26
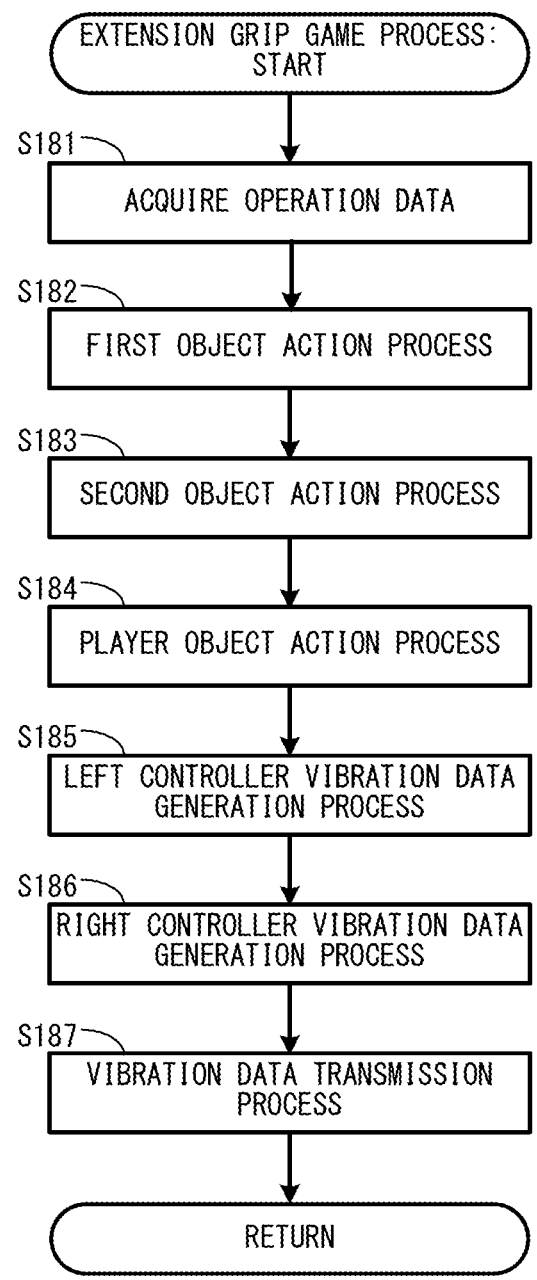

TECHNIQUES FOR VARIABLE VIBRATION WAVEFORM GENERATION BASED ON NUMBER OF CONTROLLERS

CROSS REFERENCE TO RELATED APPLICATION

The disclosure of Japanese Patent Application No. 2016-252315, filed on Dec. 27, 2016, and the disclosure of Japanese Patent Application No. 2017-001840, filed on Jan. 10, 2017, are incorporated herein by reference.

FIELD

The technology shown here relates to a storage medium having stored therein an information processing program, an information processing apparatus, an information processing system, and an information processing method in which an operation can be performed using a plurality of operation apparatuses.

BACKGROUND AND SUMMARY

Conventionally, there is a game system where a user can perform play by vertically holding a controller, and can also perform play by horizontally holding the controller.

In the above game system, however, no regard is given to the varying of the operation of a vibrator in the controller between when the user performs play by horizontally holding the controller and when the user performs play by vertically holding the controller. That is, in the above game system, no regard is given to appropriate control of the vibrator in accordance with the manner of using the controller.

Therefore, it is an object of an exemplary embodiment to provide a storage medium having stored therein an information processing program, an information processing apparatus, an information processing system, and an information processing method that are capable of, in a system where an operation can be performed using a plurality of operation apparatuses, imparting an appropriate vibration in accordance with the manner of using the operation apparatuses.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein an information processing program according to the exemplary embodiment, an information processing program is executed by a computer included in an information processing apparatus capable of communicating with each of a first operation apparatus including a first vibrator and a second operation apparatus including a second vibrator. The information processing program causes the computer to execute: setting, as an operation method, either of a first operation method using the first operation apparatus and the second operation apparatus as a set, and a second operation method using either of the first operation apparatus and the second operation apparatus; when the first operation method is set, generating first vibration data for vibrating the first vibrator and second vibration data for vibrating the second vibrator, and when the second operation method is set, generating third vibration data based on the first vibration data and the second vibration data; and when the first operation method is set, transmitting the first vibration data to the first operation apparatus and transmitting the second vibration data to the second operation apparatus, and when the second operation method is set, transmitting the third vibration data to the first operation apparatus or the second operation apparatus for use in the second operation method.

Based on the above, in the case of a first operation method in which a first operation apparatus and a second operation apparatus are used as a set, it is possible to vibrate each operation apparatus based on different vibration data. Thus, it is possible to impart an appropriate vibration corresponding to each operation apparatus. Further, in the case of a second operation method in which either of the first operation apparatus and the second operation apparatus is used, vibration data for a single operation apparatus is generated based on vibration data for vibrating each of the two operation apparatuses, and the vibration data is transmitted to either of the operation apparatuses. Thus, even when either of the first operation method and the second operation method is set, it is possible to impart an appropriate vibration based on the same vibration data.

Further, in the generation of the vibration data, when the second operation method is set, the greater of an amplitude of a vibration waveform based on the first vibration data and an amplitude of a vibration waveform based on the second vibration data may be selected every predetermined time, and the selected vibration data may be generated as the third vibration data.

Based on the above, when third vibration data is generated, a greater amplitude as a whole can be selected. Thus, it is possible to impart vibration stimulus to a user while maintaining the characteristics of the entirety of a vibration waveform to be input.

Further, in the generation of the vibration data, when the second operation method is set, the third vibration data may be generated by superimposing a vibration waveform based on the first vibration data and a vibration waveform based on the second vibration data on each other.

Based on the above, when third vibration data is generated, it is possible to cause a user to perceive vibrations overlapping each other without lacking vibrations.

Further, the information processing program may further cause the computer to execute: receiving, from the first operation apparatus, first operation data corresponding to a first operation on the first operation apparatus and second operation data corresponding to a second operation different from the first operation; and when the first operation method is set, performing predetermined information processing in accordance with the first operation data, and when the second operation method is set, and the first operation apparatus is used in the second operation method, performing the same information processing as the information processing in accordance with the second operation data.

Based on the above, the same information processing can be performed on a different operation between when an operation is performed by the first operation method and when an operation is performed by the second operation method. Thus, it is possible to set operation methods rich in variations.

Further, in the performance of the information processing, while a predetermined application is executed, the predetermined information processing may be performed in accordance with the first operation data when the first operation method is set, and the same information processing as the predetermined information processing may be performed in accordance with the second operation data when the second operation method is set, and the first operation apparatus is used in the second operation method.

Based on the above, even when the same application is executed, and a plurality of operation methods can be set, it is possible to impart an appropriate vibration.

Further, the information processing program may further cause the computer to execute: receiving, from the first operation apparatus, first operation data corresponding to a first operation on the first operation apparatus and second operation data corresponding to a second operation different from the first operation, and receiving, from the second operation apparatus, third operation data corresponding to a third operation on the second operation apparatus; and when the first operation method is set, performing predetermined information processing in accordance with the first operation data and the third operation data, and when the second operation method is set, and the first operation apparatus is used in the second operation method, performing the same information processing as the information processing in accordance with the second operation data.

Based on the above, the same information processing as information processing performed on an operation performed using both the first operation apparatus and the second operation apparatus in the first operation method can be performed by an operation performed using only the first operation apparatus in the second operation method. Thus, it is possible to set operation methods rich in variations.

Further, the information processing program may further cause the computer to execute: receiving, from the first operation apparatus, first operation data corresponding to a first operation on the first operation apparatus; when the first operation method is set, performing predetermined information processing in accordance with the first operation data, and when the second operation method is set, and the first operation apparatus is used in the second operation method, performing information processing different from the information processing in accordance with the first operation data.

Based on the above, even when the same operation is performed when an operation is performed by the first operation method and when an operation is performed by the second operation method, different information processing can be performed. Thus, it is possible to set operation methods rich in variations.

Further, in the performance of the information processing, game processing may be performed as the predetermined information processing.

Based on the above, when game processing is performed, it is possible to impart an appropriate vibration to the first operation apparatus and/or the second operation apparatus.

Further, in the setting of the operation method, the operation method may be set before a game in the game processing is started.

Based on the above, before a game is started, it is possible to set an operation method desired by a user.

Further, the exemplary embodiment may be carried out in the forms of an information processing apparatus, an information processing system, and an information processing method.

According to the exemplary embodiment, in either of an operation method using two operation apparatuses and an operation method using a single operation apparatus, it is possible to impart an appropriate vibration to a user of the operation apparatuses.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a diagram showing a non-limiting example of the state where the single user uses the information processing system 1 by holding the set of the left controller 3 and the right controller 4 in the separate state;

FIG. 14 is a diagram showing a non-limiting example of a game image displayed in a game played by moving the left controller 3 and the right controller 4;

FIG. 15 is a diagram showing a non-limiting example of the game image displayed in the game played by moving the left controller 3 and the right controller 4;

FIG. 16 is a diagram showing a non-limiting example of the game image displayed in the game played by moving the left controller 3 and the right controller 4;

FIG. 17 is a diagram showing a non-limiting example of the game image displayed in the game played by moving the left controller 3 and the right controller 4;

FIG. 18 is a diagram showing a non-limiting example of the state where a single user uses the information processing system 1 by holding one of the left controller 3 and the right controller 4 in the separate state;

FIG. 19 is a non-limiting example of an operation correspondence table indicating the actions of a player object PO for operation contents for each of operation methods;

FIG. 21 is a diagram showing a non-limiting example of a combining module for use when a high-frequency side and a low-frequency side are collectively determined;

FIG. 22 is a diagram illustrating a non-limiting example of a method for generating vibration data by an addition method;

FIG. 23 is a diagram showing a non-limiting example of a data area set in a DRAM 85 of the main body apparatus 2;

FIG. 26 is a subroutine showing a non-limiting example of the details of an extension grip game process performed in step S148 in FIG. 24.

DETAILED DESCRIPTION OF NON-LIMITING EXAMPLE EMBODIMENTS

Figure 1:
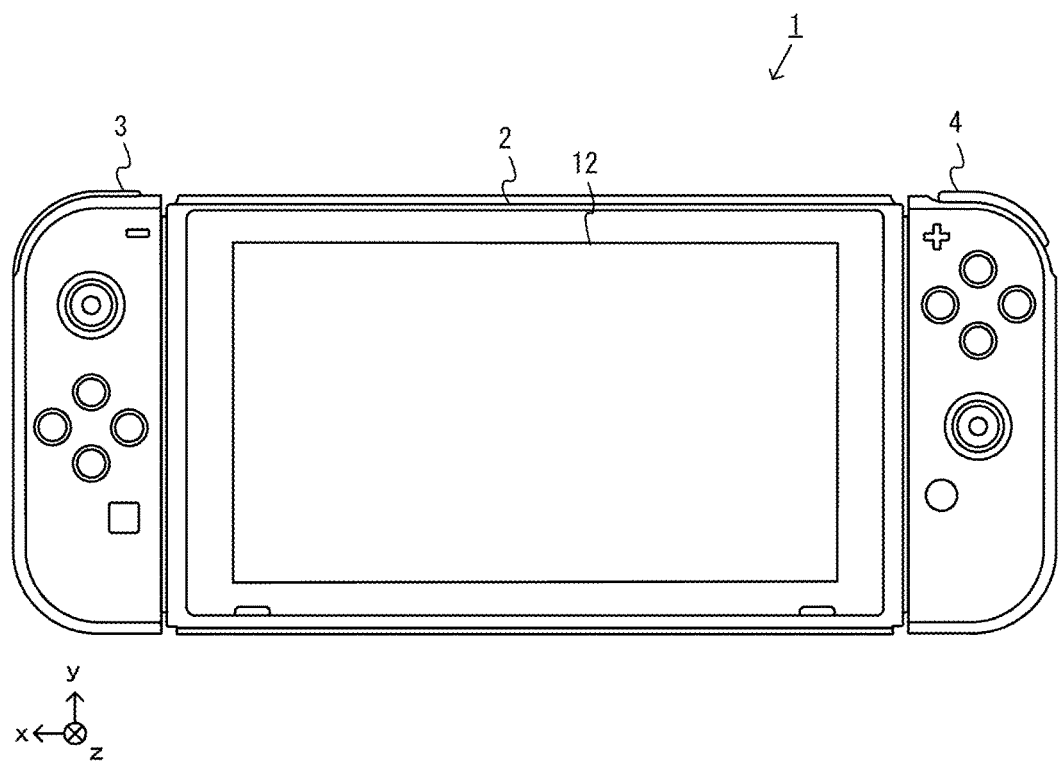
FIG. 1 is a diagram showing a non-limiting example of the state where a left controller 3 and a right controller 4 are attached to a main body apparatus 2 in an example of an information processing system 1 according to an exemplary embodiment.

A description is given below of an information processing program, an information processing apparatus, an information processing system, and an information processing method according to an exemplary embodiment. In the exemplary embodiment, an information processing system 1 includes a main body apparatus 2 (information processing apparatus; which functions as a game apparatus main body in the exemplary embodiment) 2, a left controller 3, and a right controller 4. Further, in another form, the information processing system may further include a cradle 5 (see FIGS. 6 and 7 and the like) in addition to the above configuration. In the information processing system 1 according to the exemplary embodiment, the left controller 3 and the right controller 4 are attachable to and detachable from the main body apparatus 2. The information processing system 1 can be used as a unified apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display device such as a television. In the first form, the information processing system 1 can be used as a mobile apparatus (e.g., a mobile game apparatus). Further, in the second form, the information processing system 1 can be used as a stationary apparatus (e.g., a stationary game apparatus).

FIG. 1 is a diagram showing the state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. Each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs. It should be noted that the information processing system 1 has a horizontally long shape. That is, in the exemplary embodiment, the longitudinal direction of a main surface of the information processing system 1 is referred to as a "horizontal direction" (also as a "left-right direction"), the short direction of the main surface is referred to as a "vertical direction" (also as an "up-down direction"), and a direction perpendicular to the main surface is referred to as a depth direction (also as a "front-back direction"). Further, to facilitate the understanding of directions in the information processing system 1, three axial (xyz-axis) directions are defined for the information processing system 1. Specifically, as shown in FIG. 1, in the information processing system 1, the depth direction of the display 12 from a front surface, on which the display 12 is provided, to a back surface is defined as a positive z-axis direction. In the horizontal direction perpendicular to the depth direction, the direction from the right to left (the direction from the attachment position of the right controller 4 to the attachment position of the left controller 3) is defined as a positive x-axis direction. In the up-down direction perpendicular to the depth direction and the horizontal direction, the direction upward along the display 12 is defined as a positive y-axis direction.

Figure 2:
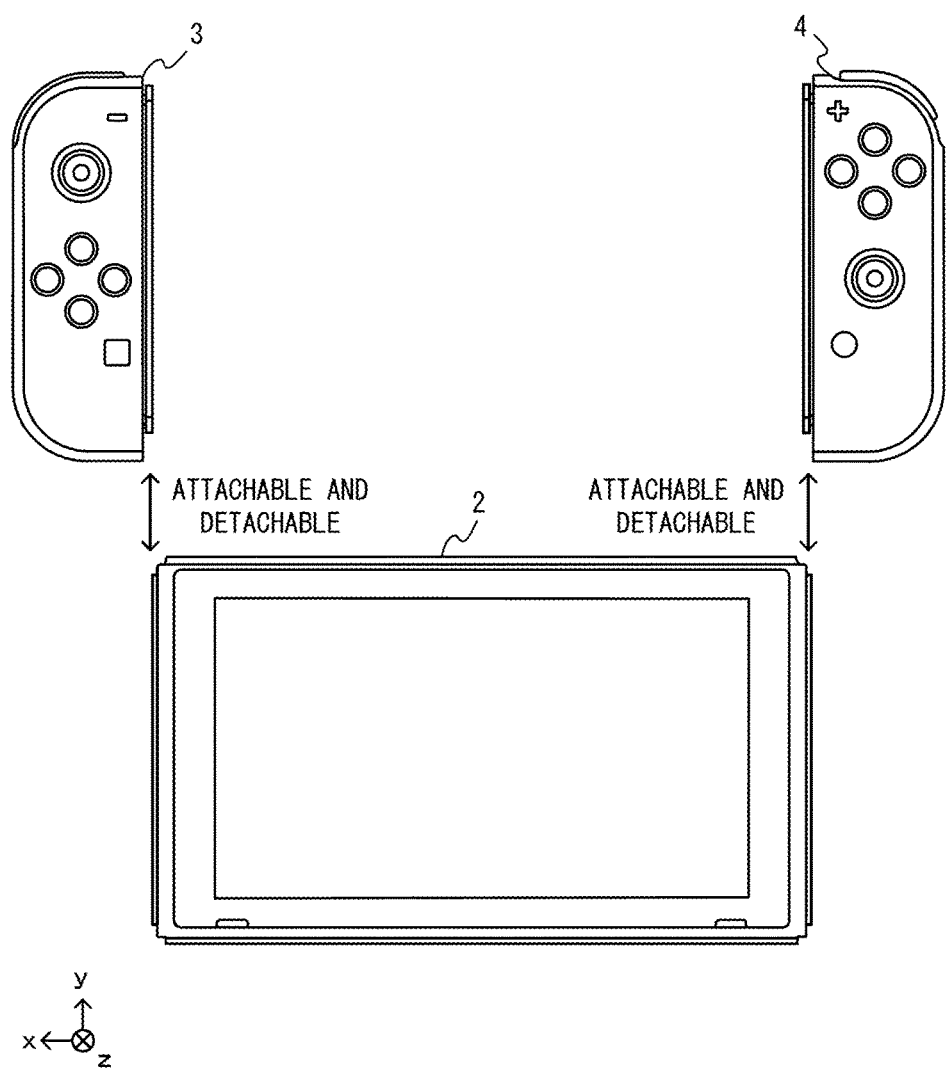
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

Figure 3:
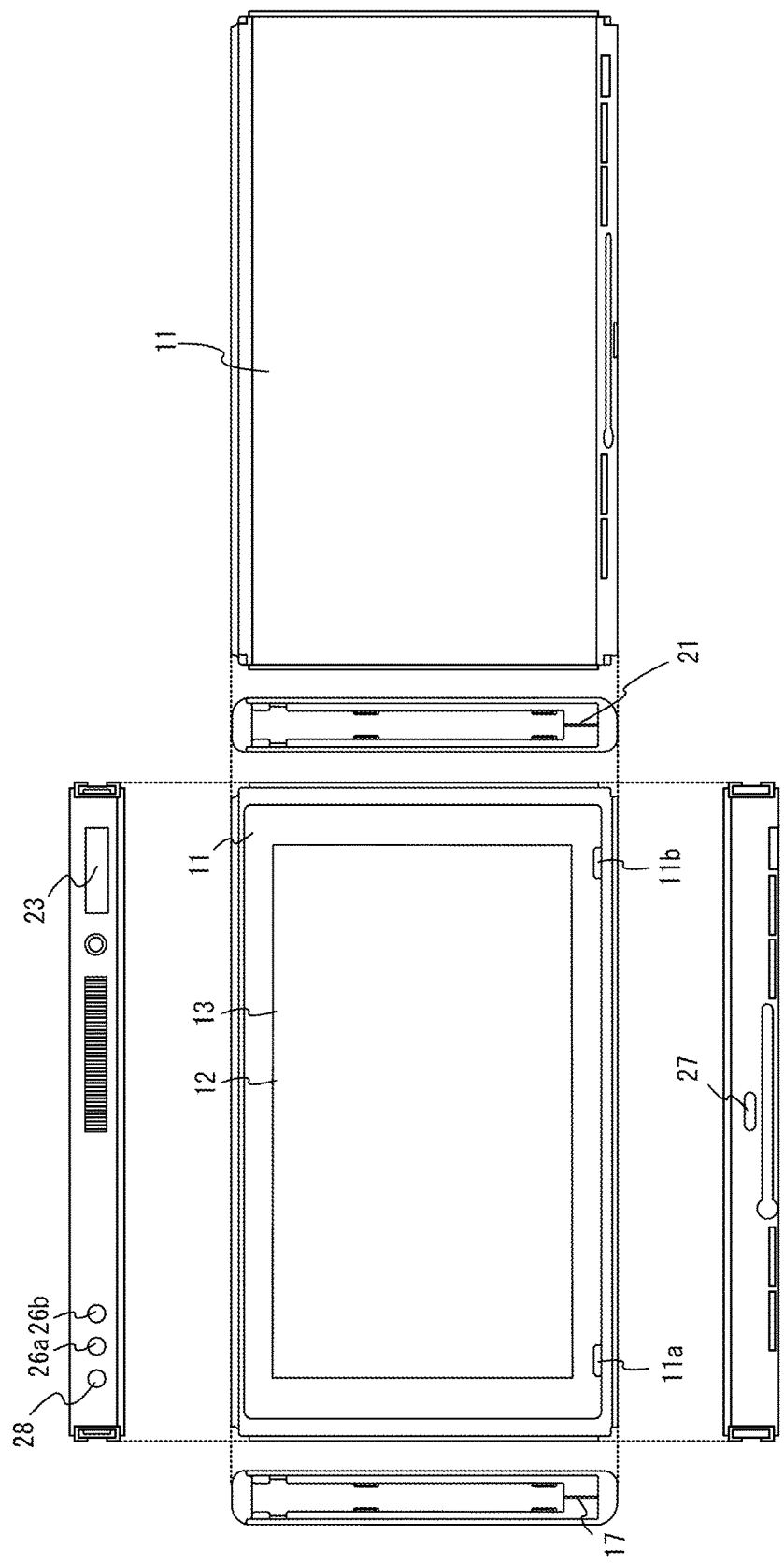
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape. In the exemplary embodiment, the housing 11 has a horizontally long shape. The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as having a vertically long shape.

It should be noted that the housing 11 are optional. As an example, the housing 11 may have a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 8) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17 for the main body apparatus 2 to perform wired communication with the left controller 3, and a right terminal 21 for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the information processing system 1 and an information processing apparatus of the same type as the information processing system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28 and sound volume buttons 26a and 26b.

The main body apparatus 2 includes a lower terminal 27. The lower terminal 27 is a terminal for the main body apparatus 2 to communicate with the cradle 5, which will be described later. In the exemplary embodiment, the lower terminal 27 is a USB connector (more specifically, a female connector).

Figure 4:
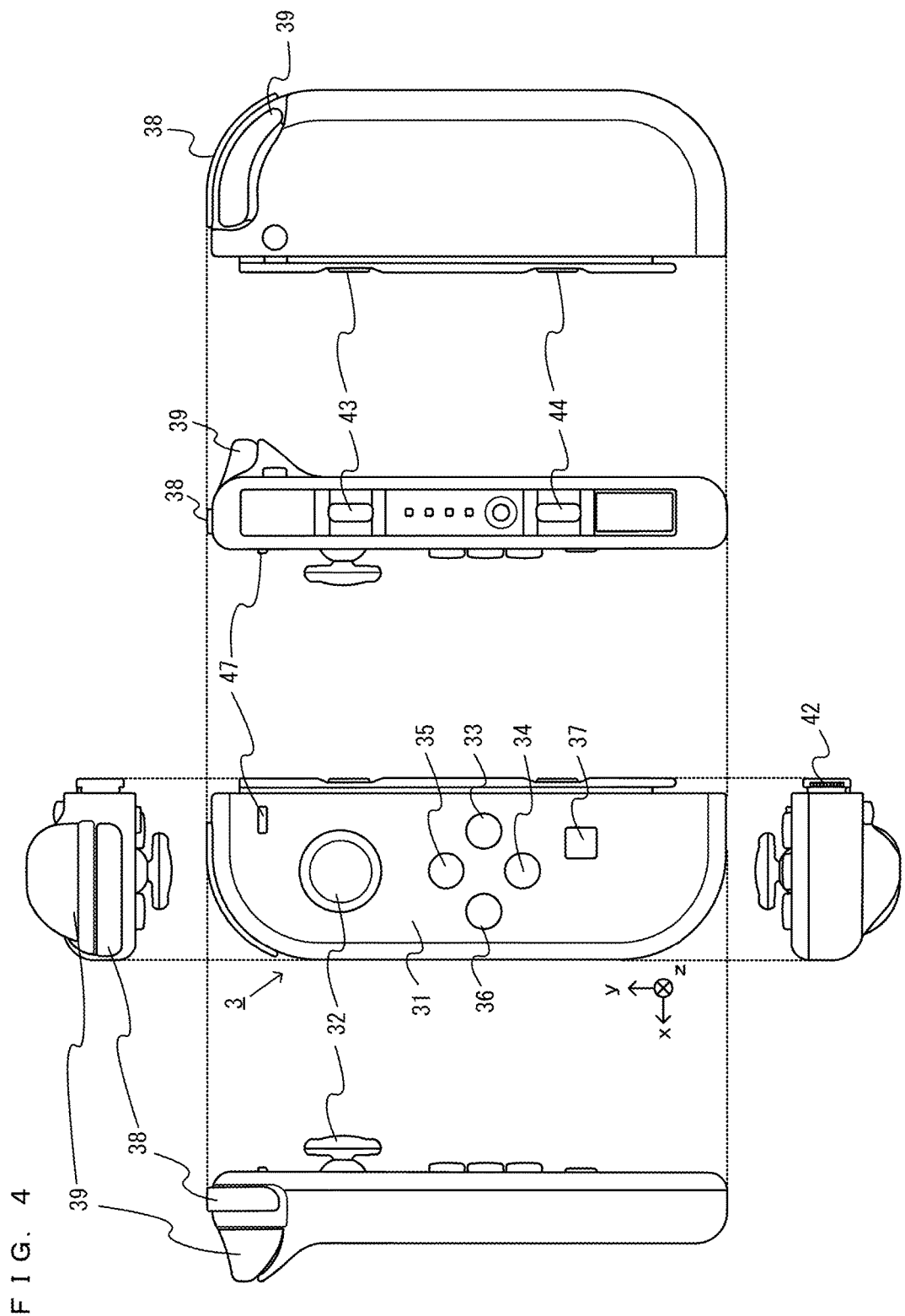
FIG. 4 is six orthogonal views showing a non-limiting example of the left controller 3.

FIG. 4 is six orthogonal views showing an example of the left controller 3, and xyz directions shown in FIG. 4 indicate three axial directions in a front view of the left controller 3. As shown in FIG. 4, the left controller 3 includes a housing 31. In the exemplary embodiment, the housing 31 has a vertically long shape, i.e., is shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
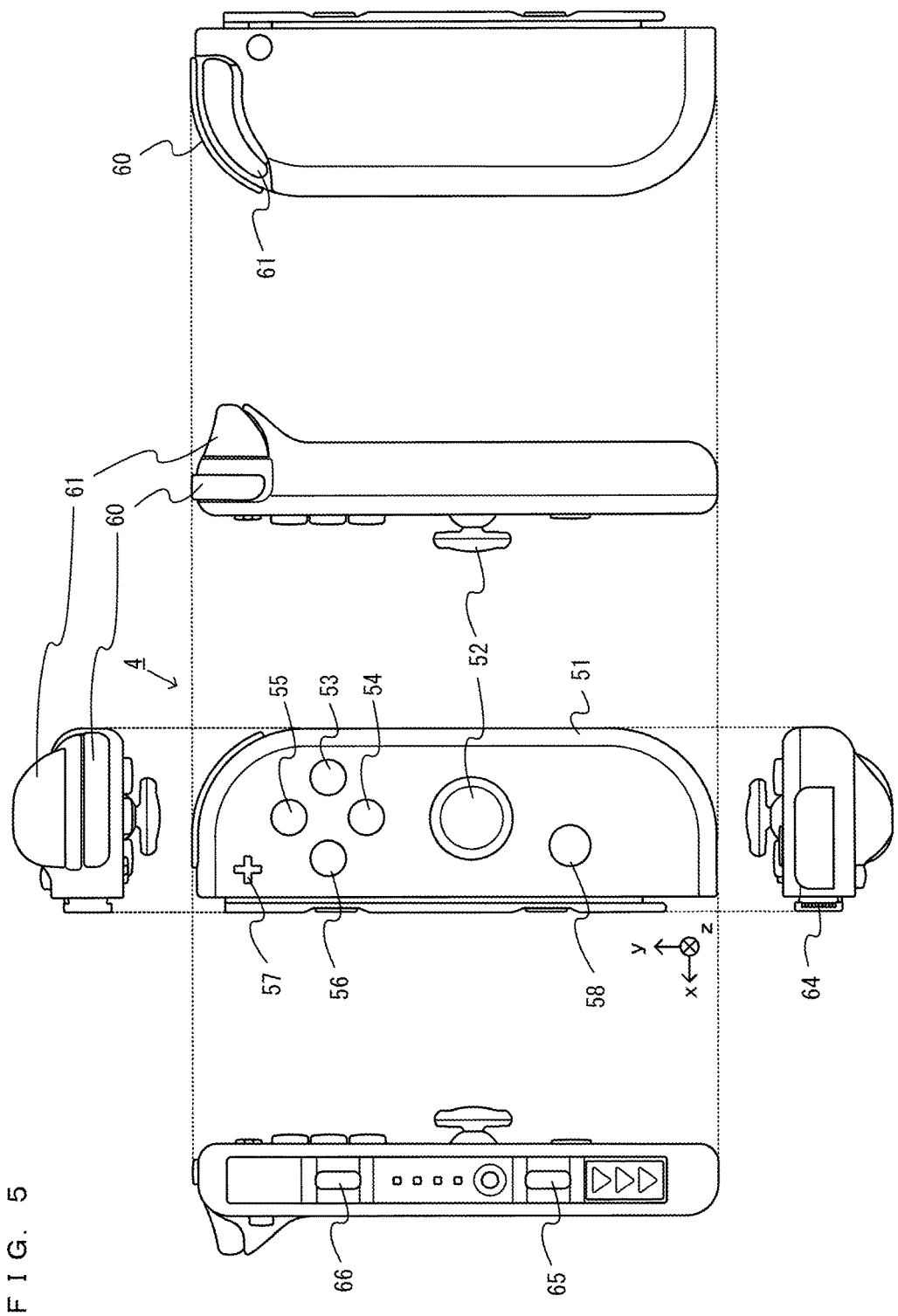
FIG. 5 is six orthogonal views showing a non-limiting example of the right controller 4.

FIG. 5 is six orthogonal views showing an example of the right controller 4, and xyz directions shown in FIG. 5 indicate three axial directions in a front view of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
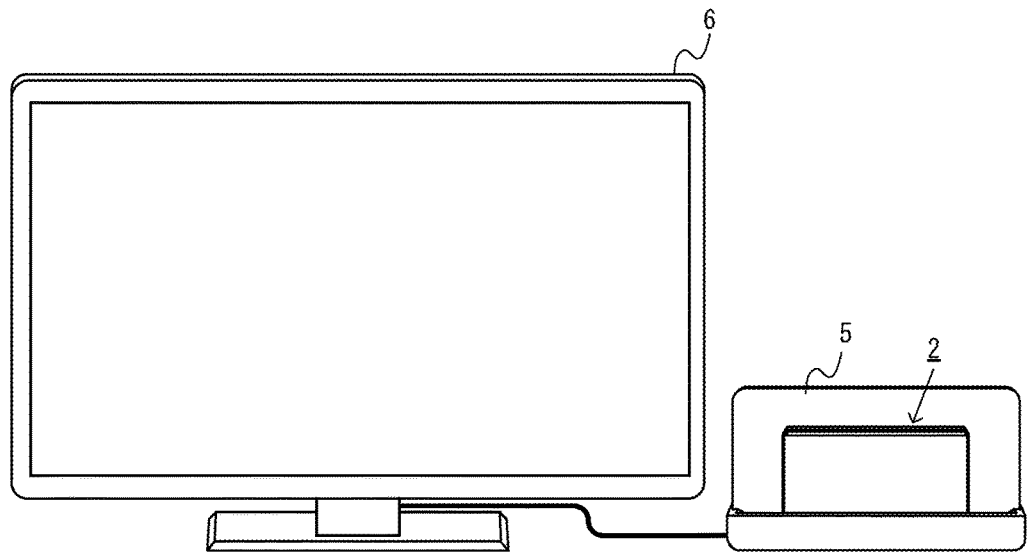
FIG. 6 is a diagram showing the overall configuration of another non-limiting example of the information processing system according to the exemplary embodiment.

FIG. 6 is a diagram showing the overall configuration of another example of the information processing system according to the exemplary embodiment. As shown in FIG. 6, as an example, the unified apparatus obtained by attaching the left controller 3 and the right controller 4 to the main body apparatus 2 can be mounted on the cradle 5. Further, as yet another example, only the main body apparatus 2 can also be mounted on the cradle 5 in the state where the left controller 3 and the right controller 4 are detached from the main body apparatus 2. Further, the cradle 5 can communicate (through wired communication or wireless communication) with a stationary monitor 6 (e.g., a stationary television), which is an example of an external display device separate from the display 12. Although the details will be described later, when the unified apparatus or the main body apparatus 2 alone is mounted on the cradle 5, the information processing system can display on the stationary monitor 6 an image acquired or generated by the main body apparatus 2. Further, in the exemplary embodiment, the cradle 5 has the function of charging the unified apparatus or the main body apparatus 2 alone mounted on the cradle 5. Further, the cradle 5 has the function of a hub device (specifically, a USB hub).

Figure 7:
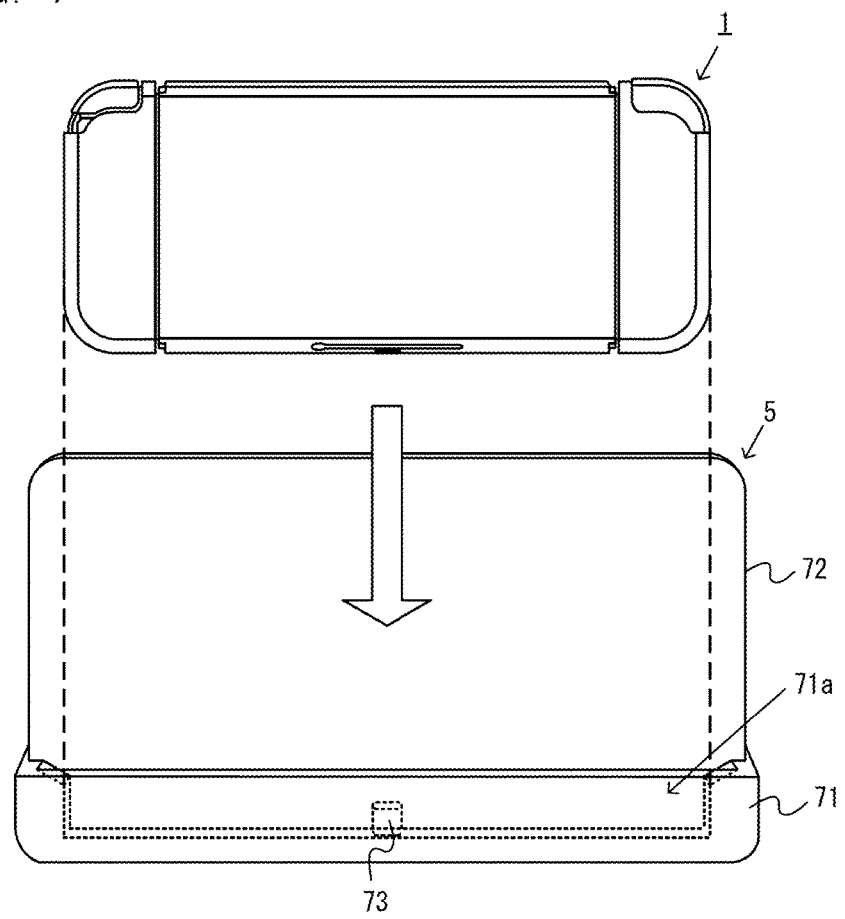
FIG. 7 is a diagram showing a non-limiting example of the external configuration of a cradle 5.

FIG. 7 is a diagram showing an example of the external configuration of the cradle 5. The cradle 5 includes a housing on which the unified apparatus or the main body apparatus 2 alone can be detachably mounted (or attached). In the exemplary embodiment, as shown in FIG. 7, the housing includes a first supporting portion 71, in which a groove 71a is formed, and an approximately planar second supporting portion 72.

As shown in FIG. 7, the groove 71a formed in the first supporting portion 71 has a shape corresponding to the shape of a lower portion of the unified apparatus. Specifically, the groove 71a is so shaped as to allow the lower portion of the unified apparatus to be inserted into the groove 71a, and more specifically, is so shaped as to approximately coincide with the lower portion of the main body apparatus 2. Thus, the lower portion of the unified apparatus is inserted into the groove 71a, whereby it is possible to mount the unified apparatus on the cradle 5. Further, the second supporting portion 72 supports a front surface of the unified apparatus (i.e., the surface on which the display 12 is provided) of which the lower portion is inserted into the groove 71a. With the second supporting portion 72, the cradle 5 can support the unified apparatus more stably. It should be noted that the shape of the housing shown in FIG. 7 is merely illustrative. In another exemplary embodiment, the housing of the cradle 5 may have any shape that allows the main body apparatus 2 to be mounted on the housing.

As shown in FIG. 7, further, the cradle 5 includes a main body terminal 73 for the cradle 5 to communicate with the unified apparatus. As shown in FIG. 7, the main body terminal 73 is provided on a bottom surface of the groove 71a, which is formed in the first supporting portion 71. More specifically, the main body terminal 73 is provided at the position where the lower terminal 27 of the main body apparatus 2 comes into contact with the main body terminal 73 when the unified apparatus is attached to the cradle 5. In the exemplary embodiment, the main body terminal 73 is a USB connector (more specifically, a male connector).

Figure 10:
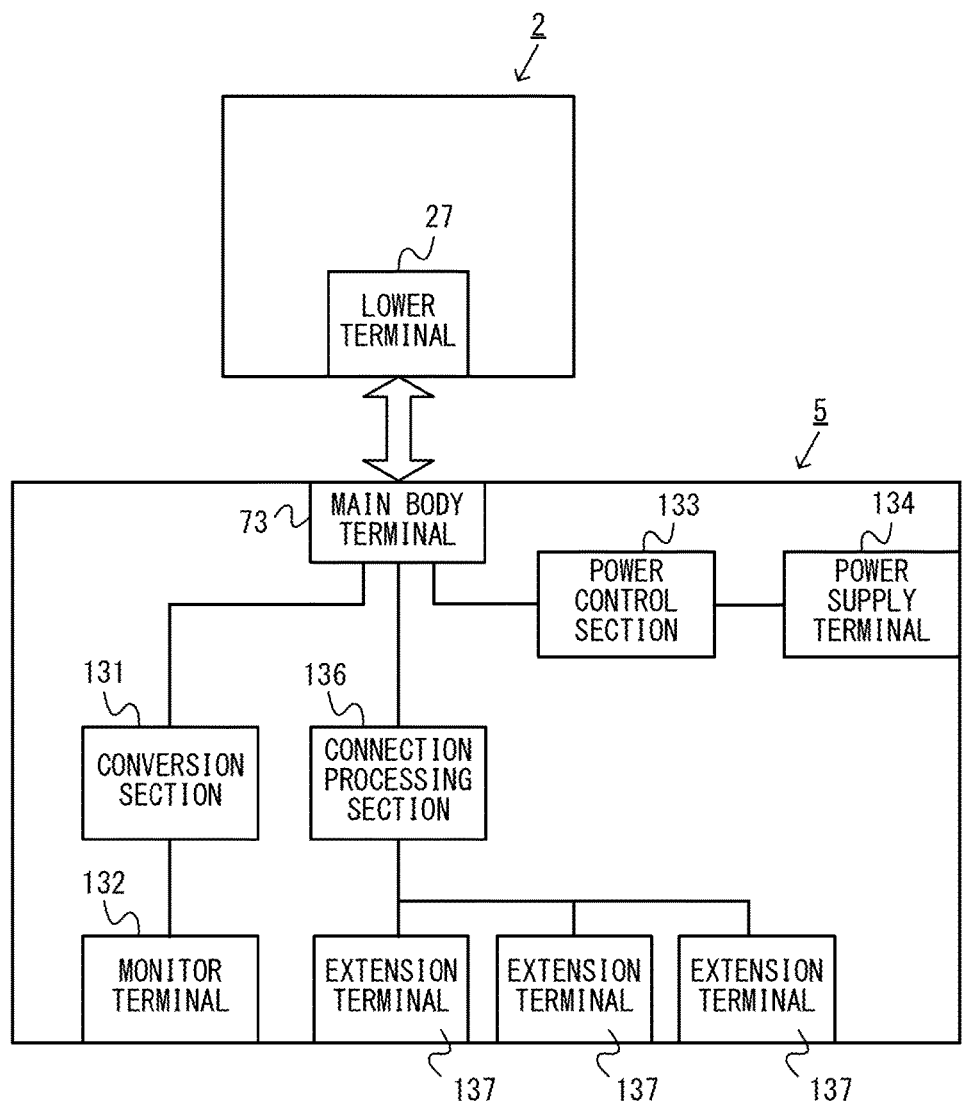
FIG. 10 is a block diagram showing a non-limiting example of the internal configuration of the cradle 5.

Although not shown in FIG. 7, the cradle 5 includes a terminal (includes a plurality of terminals, specifically, a monitor terminal 132, a power supply terminal 134, and extension terminals 137, which are shown in FIG. 10 in the exemplary embodiment) on a back surface of the housing. The details of these terminals will be described later.

Figure 8:
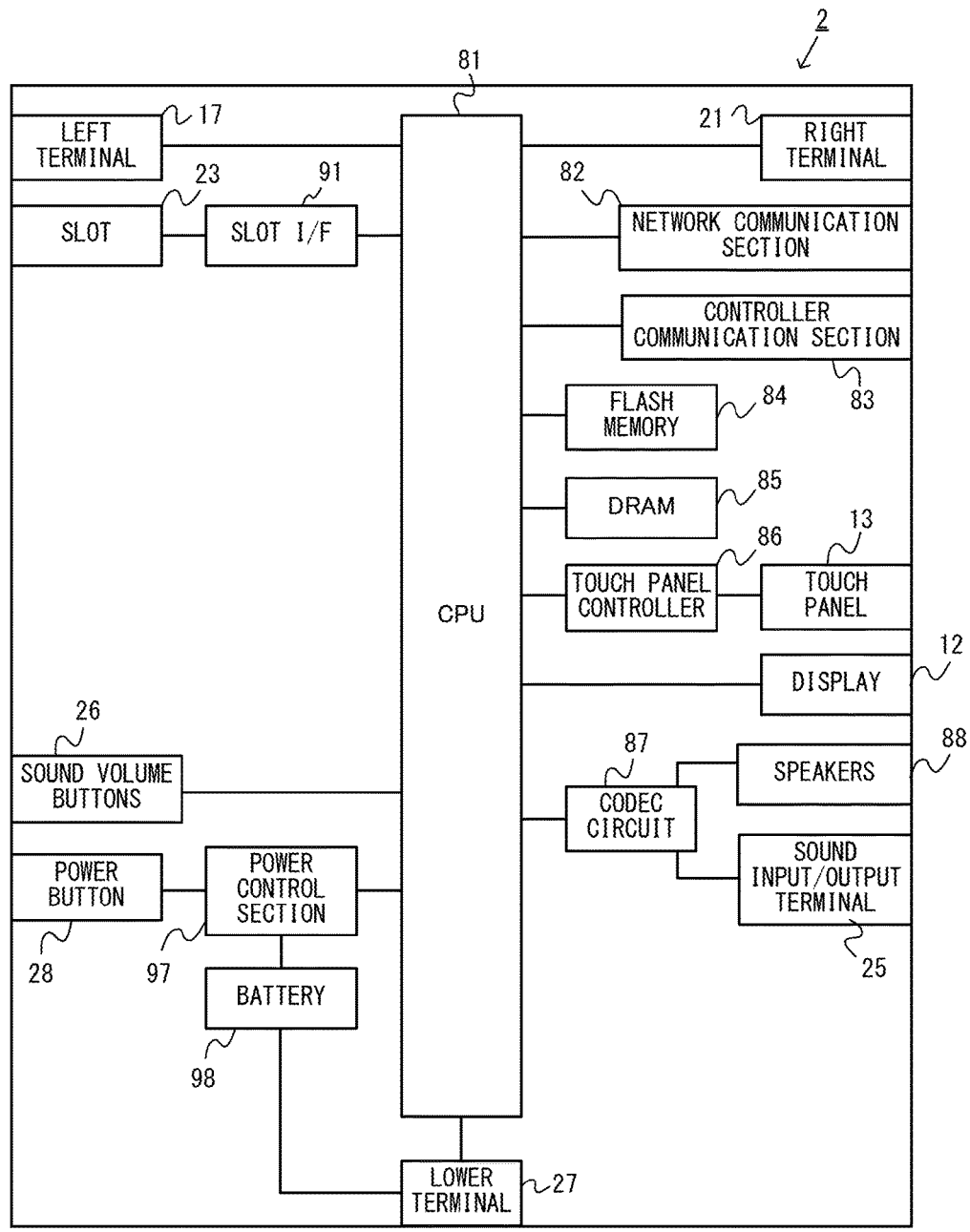
FIG. 8 is a block diagram showing a non-limiting example of the internal configuration of the main body apparatus 2.

FIG. 8 is a block diagram showing an example of the internal configuration of the main body apparatus 2. The main body apparatus 2 includes components 81 to 98 shown in FIG. 8 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program (e.g., a game program) stored in a storage section (specifically, an internal storage medium such as a flash memory 84, an external storage medium attached to the slot 23 or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the slot 23, and in accordance with an instruction from the CPU 81, reads and writes data from and to the predetermined type of storage medium (e.g., a dedicated memory card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle 5, the main body apparatus 2 can output data (e.g., image data or sound data) to the stationary monitor 6 via the cradle 5.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using a plurality of left controllers 3 and a plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25. That is, if receiving sound data from the CPU 81, the codec circuit 87 outputs sound signals obtained by performing D/A conversion on the sound data to the speakers 88 or the sound input/output terminal 25. Consequently, sounds are output from the speakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the speakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle 5) is connected to the lower terminal 27, and power is supplied to the main body apparatus 2 via the lower terminal 27, the battery 98 is charged with the supplied power.

Figure 9:
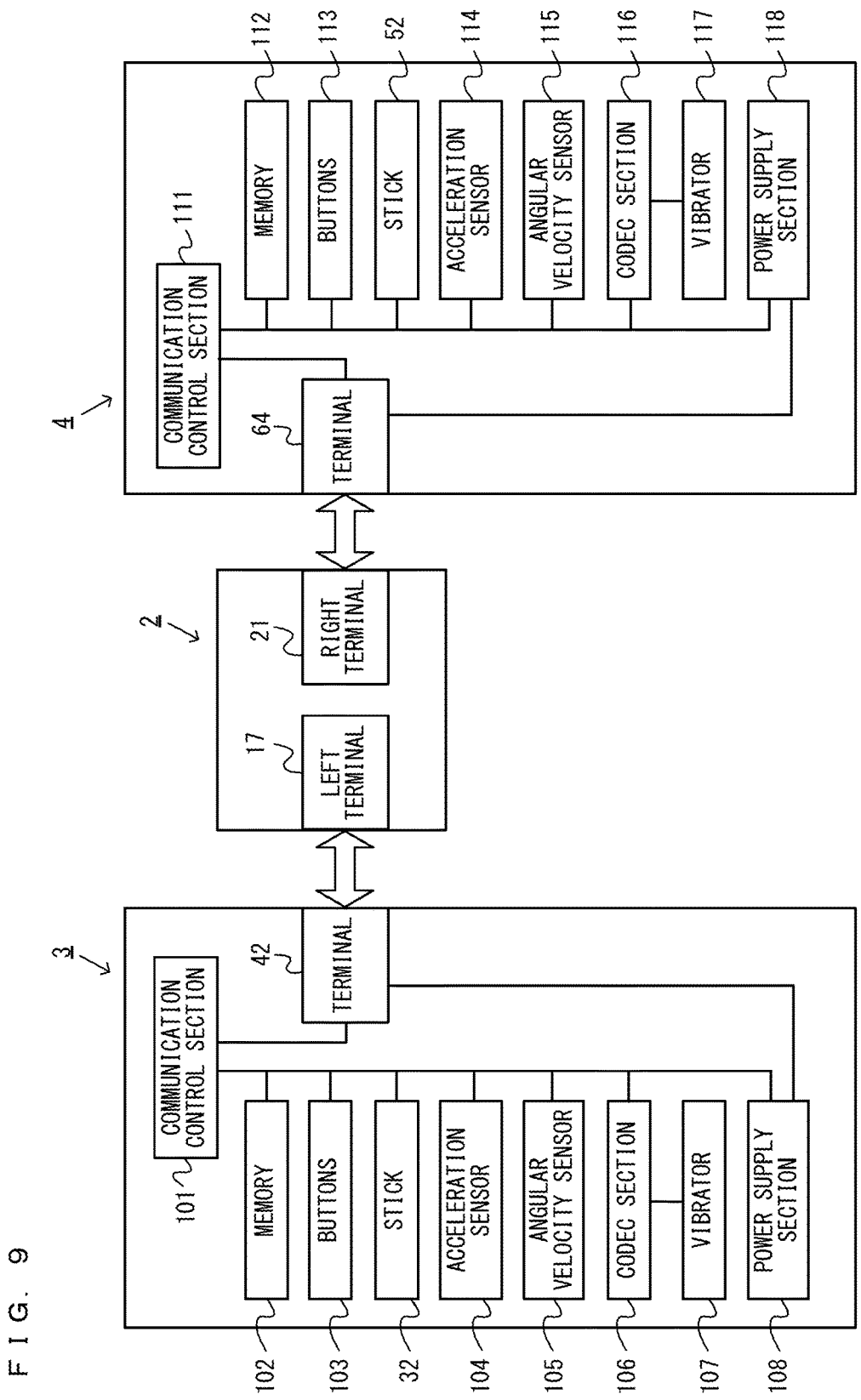
FIG. 9 is a block diagram showing a non-limiting example of the internal configuration of the information processing system 1.

FIG. 9 is a block diagram showing an example of the internal configuration of the information processing system 1. It should be noted that the details of the internal configuration of the main body apparatus 2 in the information processing system 1 are shown in FIG. 8 and therefore are omitted in FIG. 9.

The left controller 3 includes a communication control section 101, which communicates with the main body apparatus 2. As shown in FIG. 9, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, and 44). Further, the left controller 3 includes the analog stick ("stick" in FIG. 9) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., xyz axes shown in FIG. 4) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 by amplifying the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 9, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections (specifically, buttons 113, the analog stick 52, an acceleration sensor 114, and an angular velocity sensor 115) of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

FIG. 10 is a block diagram showing an example of the internal configuration of the cradle 5. It should be noted that the details of the internal configuration of the main body apparatus 2 are shown in FIG. 8 and therefore are omitted in FIG. 10.

As shown in FIG. 10, the cradle 5 includes a conversion section 131 and a monitor terminal 132. The conversion section 131 is connected to the main body terminal 73 and the monitor terminal 132. The conversion section 131 converts the formats of signals of an image (or video) and a sound received from the main body apparatus 2 into formats in which the image and the sound are output to the stationary monitor 6. Here, in the exemplary embodiment, the main body apparatus 2 outputs signals of an image and a sound as display port signals (i.e., signals compliant with the DisplayPort standard) to the cradle 5. Further, in the exemplary embodiment, as the communication between the cradle 5 and the stationary monitor 6, communication based on the HDMI (registered trademark) standard is used. That is, the monitor terminal 132 is an HDMI terminal, and the cradle 5 and the stationary monitor 6 are connected together by an HDMI cable. Then, the conversion section 131 converts the display port signals (specifically, the signals representing the video and the sound) received from the main body apparatus 2 via the main body terminal 73 into HDMI signals. The converted HDMI signals are output to the stationary monitor 6 via the monitor terminal 132.

The cradle 5 includes a power control section 133 and a power supply terminal 134. The power supply terminal 134 is a terminal for connecting a charging device (e.g., an AC adapter or the like) (not shown). In the exemplary embodiment, an AC adapter is connected to the power supply terminal 134, and mains electricity is supplied to the cradle 5. When the main body apparatus 2 is attached to the cradle 5, the power control section 133 supplies power from the power supply terminal 134 to the main body apparatus 2 via the main body terminal 73. Consequently, the battery 98 of the main body apparatus 2 is charged.

Further, the cradle 5 includes a connection processing section 136 and extension terminals 137. Each of the extension terminals 137 is a terminal for connecting to another apparatus. In the exemplary embodiment, the cradle 5 includes a plurality of (more specifically, three) USB terminals as the extension terminals 137. The connection processing section 136 is connected to the main body terminal 73 and the extension terminals 137. The connection processing section 136 has a function as a USB hub and for example, manages the communication between an apparatus connected to each of the extension terminals 137 and the main body apparatus 2 connected to the main body terminal 73 (i.e., transmits a signal from a certain apparatus to another apparatus by appropriately distributing the signal). As described above, in the exemplary embodiment, the information processing system 1 can communicate with another apparatus via the cradle 5. It should be noted that the connection processing section 136 may be able to change the communication speed, or supply power to the apparatus connected to the extension terminal 137.

As describe above, in the information processing system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle 5 and thereby can output an image (and a sound) to the stationary monitor 6. A description is given below using the information processing system in use forms in which an image (and a sound) is output to the stationary monitor 6 by attaching the main body apparatus 2 alone to the cradle 5 in the state where the left controller 3 and the right controller 4 are detached from the main body apparatus 2.

As described above, in the exemplary embodiment, the information processing system 1 can also be used in the state where the left controller 3 and the right controller 4 are detached from the main body apparatus 2 (referred to as a "separate state"). As a form in a case where an operation is performed on an application (e.g., a game application) using the information processing system 1 in the separate state, a form in which a single user uses both the left controller 3 and the right controller 4 is possible. It should be noted that when a single user uses both the left controller 3 and the right controller 4, the user can also use an accessory device (e.g., an extension grip 210 described later) for joining the left controller 3 and the right controller 4 to cause the left controller 3 and the right controller 4 to function as a single operation apparatus. Further, as another form in a case where the an operation is performed on an application (e.g., a game application) using the information processing system 1 in the separate state, a form in which a single user uses one of the left controller 3 and the right controller 4 is possible. It should be noted that when a plurality of users perform operations using the same application in this use form, a form is possible in which each of the plurality of users uses one of the left controller 3 and the right controller 4, or a form is possible in which a plurality of sets of the left controller 3 and the right controller 4 are prepared, and each user uses one of the plurality of sets.

Figure 11:
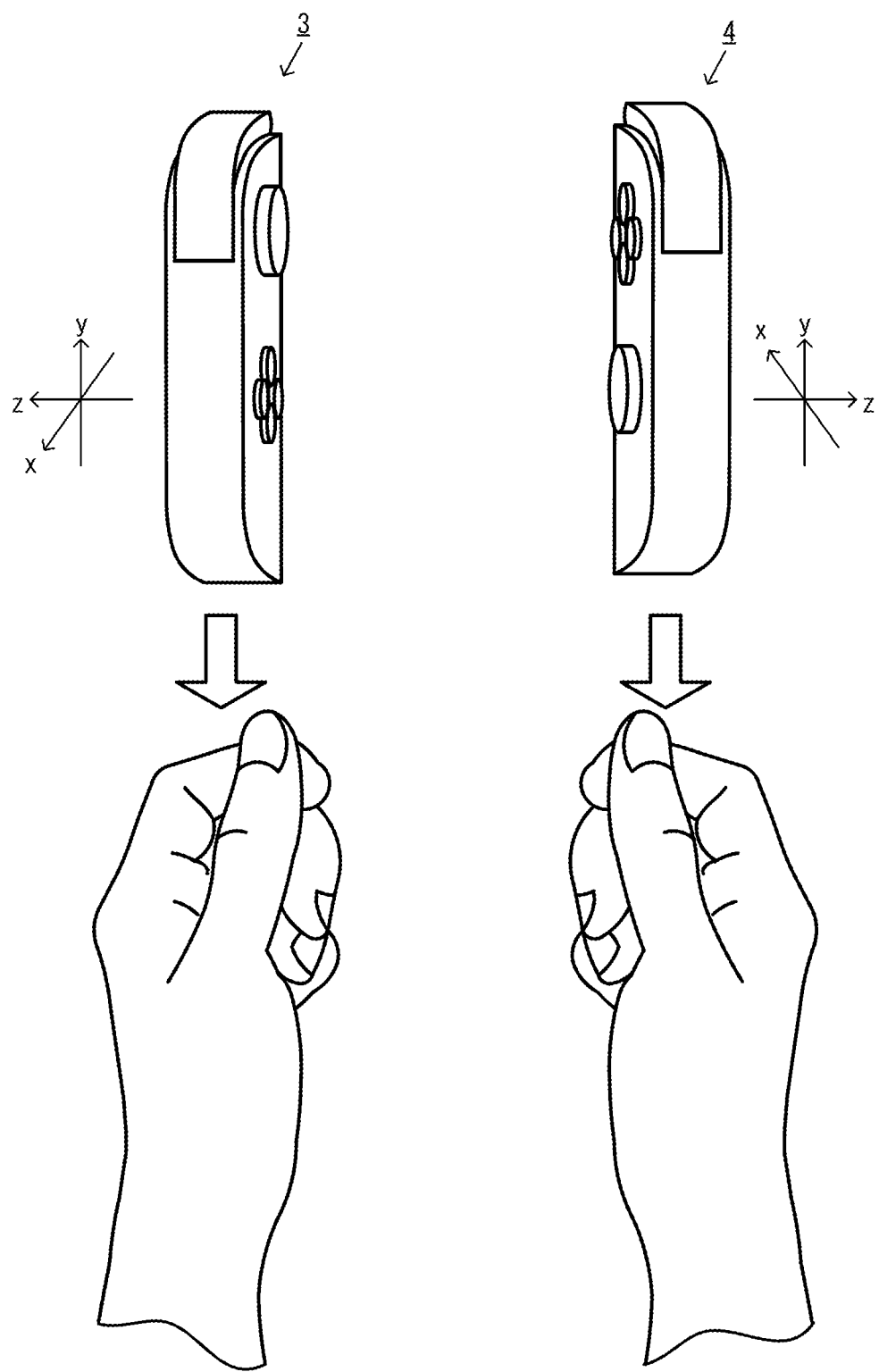
FIG. 11 is a diagram showing a non-limiting example of the state where a single user uses the information processing system 1 by holding a set of the left controller 3 and the right controller 4 in a separate state.
Figure 13:
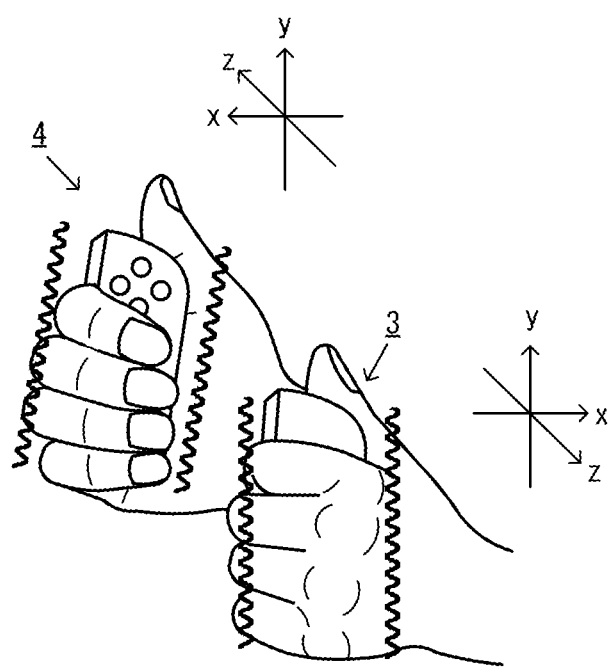
FIG. 13 is a diagram showing a non-limiting example of the state where a single user uses the information processing system 1 by holding the set of the left controller 3 and the right controller 4 in the separate state.

FIGS. 11 to 13 are diagrams showing an example of the state where a single user uses the information processing system 1 by holding a set of the left controller 3 and the right controller 4 in the separate state. As shown in FIGS. 11 to 13, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the down direction of the longitudinal direction of the left controller 3 (the down direction (the negative y-axis direction) shown in FIG. 1), which is vertically long and approximately plate-shaped, is the vertical direction, also the side surface that is in contact with the main body apparatus 2 when the left controller 3 is attached to the main body apparatus 2 is directed forward, and also the main surface of the left controller 3 (the surface on which the analog stick 32 is provided) is directed to the right. That is, the left controller 3 held with the left hand of the user is in the state where the negative x-axis direction is directed in the forward direction of the user, and the positive z-axis direction is directed to the left. Further, the user holds the right controller 4 with their right hand such that the down direction of the longitudinal direction of the right controller 4 (the down direction (the negative y-axis direction) shown in FIG. 1), which is vertically long and approximately plate-shaped, is the vertical direction, also the side surface that is in contact with the main body apparatus 2 when the right controller 4 is attached to the main body apparatus 2 is directed forward, and also the main surface of the right controller 4 (the surface on which the analog stick 52 is provided) is directed to the left. That is, the right controller 4 held with the right hand of the user is in the state where the positive x-axis direction is directed in the forward direction of the user, and the positive z-axis direction is directed to the right.

In the state where the left controller 3 is held with the left hand, and the right controller 4 is held with the right hand (hereinafter, such an operation method will occasionally be referred to as a "vertically-held operation method", and the orientations of the left controller 3 and the right controller 4 held in these directions will occasionally be referred to as "basic orientations"), each controller is moved in up, down, left, right, front, and back directions, rotated, or swung, whereby game play is performed in accordance with the motion or the orientation of the controller. Then, in the above game play, the acceleration sensor 104 of the left controller 3 can detect accelerations in the xyz-axis directions as operation inputs, and the angular velocity sensor 105 can detect angular velocities about the xyz-axis directions as operation inputs. Further, the acceleration sensor 114 of the right controller 4 can detect accelerations in the xyz-axis directions as operation inputs, and the angular velocity sensor 115 can detect angular velocities about the xyz-axis directions as operation inputs. Further, in the vertically-held operation, it is possible to perform the operation of pressing the first L-button 38 with the thumb of the left hand of the user and perform the operation of pressing the first R-button 60 with the thumb of the right hand of the user, and game play is also performed by these button operations.

Further, in the exemplary embodiment, when the user performs game play by holding the left controller 3 and the right controller 4, vibrations are imparted to the left controller 3 and/or the right controller 4 in accordance with the situation of this game. As described above, the left controller 3 includes the vibrator 107, and the right controller 4 includes the vibrator 117. The CPU 81 of the main body apparatus 2 transmits vibration data to the left controller 3 and/or the right controller 4 in accordance with the situation of an executed game and thereby can vibrate the vibrator 107 and/or the vibrator 117 at an amplitude and a frequency corresponding to the vibration data.

Next, FIGS. 14 to 16 are diagrams showing examples of a game image displayed in a game played by moving the left controller 3 and the right controller 4. As shown in FIG. 14, in this exemplary game, an image of a game (e.g., a boxing game) in which a player object PO and an enemy object EO compete against each other is displayed on the stationary monitor 6. Then, the user operating the left controller 3 and the right controller 4 can operate the player object PO by swinging the main body of the left controller 3 and/or the main body of the right controller 4, changing the orientations of the main body of the left controller 3 and/or the main body of the right controller 4, or pressing an operation button (e.g., the first L-button 38 or the first R-button 60).

For example, the user swings the left controller 3 and thereby can control the action of a first object G1, which represents a left glove (a left fist) of the player object PO. The user swings the right controller 4 and thereby can control the action of a second object G2, which represents a right glove (a right fist) of the player object PO. Specifically, when the user performs the operation of swinging so as to throw a left punch using the left hand holding the left controller 3, the first object G1, which represents the left glove of the player object PO, moves toward the place where the enemy object EO is placed. Further, when the user performs the operation of swinging so as to throw a right punch using the right hand holding the right controller 4, the second object G2, which represents the right glove of the player object PO, moves toward the place where the enemy object EO is placed.

Specifically, when the right controller 4 is swung so as to be pushed forward (in the positive x-axis direction of the right controller 4) in the state where neither of the left controller 3 and the right controller 4 moves (the state shown in FIG. 14), then as shown in FIG. 15, the second object G2 of the player object PO moves toward the enemy object EO in accordance with the motion of the right controller 4. Consequently, a game image is displayed such that the player object PO throws a right punch at the enemy object EO. Further, when the left controller 3 is swung so as to be pushed forward (in the negative x-axis direction of the left controller 3) in the state where neither of the left controller 3 and the right controller 4 moves, the first object G1 of the player object PO moves toward the enemy object EO in accordance with the motion of the left controller 3. Consequently, a game image is displayed such that the player object PO throws a left punch at the enemy object EO.

Here, the moving direction of the first object G1 starting moving is set by the orientation of the left controller 3 when the left controller 3 is swung so as to be pushed forward. Further, the moving direction of the second object G2 starting moving is set by the orientation of the right controller 4 when the right controller 4 is moved so as to be pushed forward. For example, when the right controller 4 moves in the positive x-axis direction as shown in FIG. 15, the moving direction of the second object G2 is set in accordance with the orientation in a roll direction of the right controller 4 in this movement. As an example, in the exemplary embodiment, in the period in which the right controller 4 moves, the tilt in the y-axis direction of the right controller 4 with respect to the direction in which a gravitational acceleration acts in real space is calculated, and the moving direction of the second object G2 is calculated based on the tilt in the y-axis direction. Specifically, when the tilt in the y-axis direction indicates that the right controller 4 is in the orientation in which the right controller 4 roll-rotates in the right direction with respect to the above reference orientation, the second object G2 moves in the right direction in a virtual space. Further, when the tilt in the y-axis direction indicates that the right controller 4 is in the orientation in which the right controller 4 roll-rotates in the left direction with respect to the reference orientation, the second object G2 moves in the left direction in the virtual space. Then, the angle at which the moving direction shifts in the right direction or the left direction is calculated in accordance with the tilt angle in the y-axis direction.

Further, in this exemplary game, even when the distance between the player object PO and the enemy object EO is relatively long in the virtual space, it is possible to throw a punch. The arms of the player object PO extend, whereby the first object G1 and the second object G2 can move by a relatively long distance. Then, the first object G1 or the second object G2 collides with another object (e.g., the enemy object EO) or moves by a predetermined distance, then finishes the movement, and returns to a movement start position where the first object G1 or the second object G2 starts moving (e.g., a hand portion of the player object PO shown in FIG. 14). The first object G1 and the second object G2 return to the movement start positions and thereby can make a next movement toward the enemy object EO. In other words, it is possible to throw a next punch. Thus, the time from when the first object G1 or the second object G2 starts moving from the movement start position to when the first object G1 or the second object G2 returns to the movement start position again is longer than in a general boxing game.

Further, in this exemplary game, even while the first object G1 or the second object G2 is moving using such a movement time (typically, the period in which the first object G1 or the second object G2 is moving in the direction of the enemy object EO), it is possible to change a trajectory moving in accordance with the orientation or the motion of the left controller 3 or the right controller 4. For example, when the left controller 3 or the right controller 4 rotates in the roll direction or rotates in a yaw direction from the orientation of the left controller 3 or the right controller 4 when the first object G1 or the second object G2 starts moving, the trajectory of the first object G1 or the second object G2 is changed in accordance with the rotation.

As an example, in the exemplary embodiment, in the state where the rotational velocity (the angular velocity) about the x-axis of the left controller 3 or the right controller 4 after the first object G1 or the second object G2 starts moving is the rotation in the roll direction, the trajectory of the first object G1 or the second object G2 moving based on this rotational velocity about the x-axis is changed. Specifically, when the rotational velocity of the left controller 3 roll-rotating in the right direction about the x-axis while the first object G1 is moving is obtained, the trajectory of the first object G1 is changed in the right direction in the virtual space. When the rotational velocity of the left controller 3 roll-rotating in the left direction about the x-axis is obtained, the trajectory of the first object G1 is changed in the left direction in the virtual space. Further, when the rotational velocity of the right controller 4 roll-rotating in the right direction about the x-axis while the second object G2 is moving is obtained, the trajectory of the second object G2 is changed in the right direction in the virtual space. When the rotational velocity of the right controller 4 roll-rotating in the left direction about the x-axis is obtained, the trajectory of the second object G2 is changed in the left direction in the virtual space.

As another example, in the exemplary embodiment, in the state where the rotational velocity (the angular velocity) of the left controller 3 or the right controller 4 about the direction of gravity in real space after the first object G1 or the second object G2 starts moving is the rotation in the yaw direction, the trajectory of the first object G1 or the second object G2 moving based on this rotational velocity is changed. Specifically, when the rotational velocity of the left controller 3 yaw-rotating in the right direction about the direction of gravity while the first object G1 is moving is obtained, the trajectory of the first object G1 is changed in the right direction in the virtual space. When the rotational velocity of the left controller 3 yaw-rotating in the left direction about the direction of gravity is obtained, the trajectory of the first object G1 is changed in the left direction in the virtual space. Further, when the rotational velocity of the right controller 4 yaw-rotating in the right direction about the direction of gravity while the second object G2 is moving is obtained, the trajectory of the second object G2 is changed in the right direction in the virtual space. When the rotational velocity of the right controller 4 yaw-rotating in the left direction about the direction of gravity is obtained, the trajectory of the second object G2 is changed in the left direction in the virtual space.

Further, in this exemplary game, using the magnitude of an acceleration generated in the left controller 3 or the right controller 4, it is determined whether or not the left controller 3 or the right controller 4 is swung. Then, when it is determined that the left controller 3 is swung in the negative x-axis direction in the state where the first object G1 is placed at the movement start position, the first object G1 starts moving from the movement start position toward the enemy object EO. Further, when it is determined that the right controller 4 is swung in the positive x-axis direction in the state where the second object G2 is placed at the movement start position, the second object G2 starts moving from the movement start position toward the enemy object EO.

Further, in this exemplary game, even when one of the first object G1 and the second object G2 starts moving from the movement start position and is moving, it is possible to cause also the other of the first object G1 and the second object G2 to start moving from the movement start position. For example, as shown in FIG. 16, the user swings the right controller 4 so as to push the right controller 4 forward (in the positive x-axis direction of the right controller 4), whereby the second object G2 starts moving toward the enemy object EO. Then, the user swings the left controller 3 so as to push the left controller 3 forward (in the negative x-axis direction of the left controller 3) during the movement of the second object G2, whereby the first object G1 also starts moving toward the enemy object EO. Thus, on the stationary monitor 6 shown in FIG. 16, a game image is displayed in which both the first object G1 and the second object G2 move toward the enemy object EO. Further, FIG. 16 shows an example of a game image in which the second object G2 having started moving first collides with (hits) the enemy object EO.

Here, in this exemplary game, vibrations are imparted to the left controller 3 and/or the right controller 4 in accordance with the states of the first object G1 and/or the second object G2 in a virtual game world. As an example, in this exemplary game, when the first object G1 moves in the virtual game world, a vibration corresponding to the type, the moving velocity, the moving direction, the collision state, and the like of the first object G1 is imparted to the left controller 3. Further, when the second object G2 moves in the virtual game world, a vibration corresponding to the type, the moving velocity, the moving direction, the collision state, and the like of the second object G2 is imparted to the right controller 4.

For example, in the example shown in FIG. 15, the user swings the right controller 4 so as to push the right controller 4 forward (in the positive x-axis direction of the right controller 4), whereby the second object G2 moves toward the enemy object EO in the virtual game world, and a vibration corresponding to this movement is imparted only to the right controller 4. Further, in the example shown in FIG. 16, the user swings the left controller 3 so as to push the left controller 3 forward (in the negative x-axis direction of the left controller 3) during the movement of the second object G2, whereby the first object G1 also moves toward the enemy object EO in the virtual game world, and a vibration corresponding to this movement is imparted only to the left controller 3. Meanwhile, the second object G2 collides with (hits) the enemy object EO in the virtual game world. Thus, a vibration corresponding to this collision is imparted only to the right controller 4. As described above, in accordance with the movement states of the first object G1 and the second object G2, independent and different vibrations are imparted to the left controller 3 and the right controller 4. Thus, a realistic vibration is imparted to the user by each controller.

Further, in this exemplary game, it is possible to move the player object PO or cause the player object PO to perform an action in the virtual game world in accordance with the motions or the orientations of both the left controller 3 and the right controller 4. For example, when both the left controller 3 and the right controller 4 rotate in a pitch direction or rotate in the roll direction in real space, the player object PO is caused to move in accordance with the tilts of the rotations. Specifically, the tilts in the x-axis direction and the y-axis direction of the left controller 3 and the tilts in the x-axis direction and the y-axis direction of the right controller 4 with respect to the direction of gravity in real space are calculated. Then, based on these tilts, when it is determined that both the left controller 3 and the right controller 4 are in the orientations in which the left controller 3 and the right controller 4 are tilted forward, the player object PO is caused to move forward in the virtual game world by the amount of movement corresponding to the angles at which both the left controller 3 and the right controller 4 are tilted forward (e.g., the average value of these angles). Further, based on these tilts, when it is determined that both the left controller 3 and the right controller 4 are in the orientations in which the left controller 3 and the right controller 4 are tilted backward, the player object PO is caused to move backward in the virtual game world by the amount of movement corresponding to the angles at which both the left controller 3 and the right controller 4 are tilted backward (e.g., the average value of these angles). Further, based on these tilts, when it is determined that both the left controller 3 and the right controller 4 are in the orientations in which the left controller 3 and the right controller 4 are tilted to the left, the player object PO is caused to move to the left in the virtual game world by the amount of movement corresponding to the angles at which both the left controller 3 and the right controller 4 are tilted to the left (e.g., the average value of these angles). Further, based on these tilts, when it is determined that both the left controller 3 and the right controller 4 are in the orientations in which the left controller 3 and the right controller 4 are tilted to the right, the player object PO is caused to move to the right in the virtual game world by the amount of movement corresponding to the angles at which both the left controller 3 and the right controller 4 are tilted to the right (e.g., the average value of these angles). Further, based on these tilts, when it is determined that both the left controller 3 and the right controller 4 are in the orientations in which the left controller 3 and the right controller 4 are tilted inward, the player object PO performs the action of defending against an attack from the enemy object EO in the virtual game world.

Further, in this exemplary game, in accordance with operations on the operation buttons of the left controller 3 and the right controller 4, it is possible to cause the player object PO to move or perform an action in the virtual space. For example, when the first L-button 38 of the left controller 3 is subjected to a pressing operation, the player object PO moves dashing (moves rapidly) in the virtual game world. Further, when the first R-button 60 of the right controller 4 is subjected to a pressing operation, the player object PO jumps in the virtual game world.

Further, in the exemplary embodiment, it is also possible to play the above game using an attachment (an accessory device) for joining the left controller 3 and the right controller 4 to cause the left controller 3 and the right controller 4 to function as a single operation apparatus.

FIG. 17 is a diagram showing an example of an accessory device to which the left controller 3 and the right controller 4 are attachable. As shown in FIG. 17, an extension grip 210, which is an example of the accessory device, is an accessory device used by the user to perform an operation. The left controller 3 is attachable to the extension grip 210, and the right controller 4 is also attachable to the extension grip 210. Thus, with the extension grip 210, the user can perform an operation (hereinafter, such an operation method will occasionally be referred to as an "extension grip operation method") by holding, in a unified manner, the two controllers 3 and 4 detached from the main body apparatus 2.

The extension grip 210 has mechanisms similar to those of the main body apparatus 2 (specifically, the left rail member 15, the right rail member 19, and the like) as mechanisms for attaching the left controller 3 and the right controller 4. Thus, similarly to the case where the left controller 3 and the right controller 4 are attached to the main body apparatus 2, the left controller 3 and the right controller 4 can be attached to the extension grip 210. Specifically, in the extension grip 210, mechanisms for attaching the left controller 3 and the right controller 4 are provided on both left and right sides across a main body portion having a predetermined width, and rail members for attaching the left controller 3 and the right controller 4 are provided in parallel. Consequently, the left controller 3 and the right controller 4 are attached to the extension grip 210 such that the xyz-axis directions of the left controller 3 and the right controller 4 are parallel to each other. Then, the user holds with both hands the left controller 3 and the right controller 4 attached to the extension grip 210 and unified. Consequently, the user can hold in a unified manner the two controllers, namely the left controller 3 and the right controller 4, detached from the main body apparatus 2.

When the above game is played using the left controller 3 and the right controller 4 unified by such an extension grip 210, an operation is performed using the operation buttons and the sticks provided in the left controller 3 and the right controller 4. For example, when the B-button 54 of the right controller 4 is subjected to a pressing operation, the player object PO throws a left punch, and the first object G1 starts moving. When the A-button 53 of the right controller 4 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the X-button 55 of the right controller 4 is subjected to a pressing operation, the player object PO performs the action of jumping in the virtual game world. Then, when the Y-button 56 of the right controller 4 is subjected to a pressing operation, the player object PO dashes (moves rapidly) in the virtual game world.

Also when game play is performed using the extension grip 210, vibrations are imparted to the left controller 3 and/or the right controller 4 attached to the extension grip 210 in accordance with the states of the first object G1 and/or the second object G2 in the virtual game world. As an example, also when game play is performed using the extension grip 210, and when the first object G1 moves in the virtual game world, a vibration corresponding to the type, the moving velocity, the moving direction, the collision state, and the like of the first object G1 is imparted to the left controller 3 attached to the extension grip 210. Further, when the second object G2 moves in the virtual game world, a vibration corresponding to the type, the moving velocity, the moving direction, the collision state, and the like of the second object G2 is imparted to the right controller 4 attached to the extension grip 210.

For example, in the example shown in FIG. 17, the user presses the A-button 53 of the right controller 4, whereby the second object G2 moves toward the enemy object EO in the virtual game world, and a vibration corresponding to this movement is imparted to the right controller 4 attached to the extension grip 210. Further, the user presses the B-button 54 of the right controller 4 during the movement of the second object G2, whereby the first object G1 also moves toward the enemy object EO in the virtual game world, and a vibration corresponding to this movement is also imparted to the left controller 3 attached to the extension grip 210. Meanwhile, the second object G2 collides with (hits) the enemy object EO in the virtual game world. Thus, a vibration corresponding to this collision is imparted to the right controller 4 attached to the extension grip 210. As described above, in accordance with the movement states of the first object G1 and the second object G2, independent and different vibrations are imparted also to the left controller 3 and the right controller 4 attached to the extension grip 210. Thus, a realistic vibration is imparted to the user by each controller.

FIG. 18 is a diagram showing an example of the state where a single user uses the information processing system 1 by holding one of the left controller 3 and the right controller 4 in the separate state. As shown in FIG. 18, in the separate state, the user can view an image displayed on the stationary monitor 6 while performing an operation by, for example, holding the left controller 3 with both hands.

For example, in the exemplary embodiment, the user holds the left controller 3 with both hands such that the longitudinal direction of the left controller 3 (the y-axis direction shown in FIG. 1), which is vertically long and approximately plate-shaped, is the horizontal direction, also the side surface that is in contact with the main body apparatus 2 when the left controller 3 is attached to the main body apparatus 2 is directed forward, and also the main surface of the left controller 3 (the surface on which the analog stick 32 is provided) is directed upward. That is, the left controller 3 held with both hands of the user is in the state where the positive y-axis direction is the left direction of the user, and the negative x-axis direction is directed in the forward direction of the user, and the positive z-axis direction is directed downward. It should be noted that when the user holds the right controller 4, which is vertically long and approximately plate-shaped, with both hands, the user holds the right controller 4 such that the longitudinal direction of the right controller 4 (the y-axis direction shown in FIG. 1), which is vertically long and approximately plate-shaped, is the horizontal direction, also the side surface that is in contact with the main body apparatus 2 when the right controller 4 is attached to the main body apparatus 2 is directed forward, and also the main surface of the right controller 4 (the surface on which the analog stick 52 is provided) is directed upward.

As described above, in the state where one of the left controller 3 and the right controller 4 is held with both hands (hereinafter, such an operation method will occasionally be referred to as a "horizontally-held operation method"), the operation buttons and the stick of the one controller are operated, whereby game play is performed. For example, in the horizontally-held operation, the left hand of the user is placed on an upper surface of the one controller (the side surface further in the positive y-axis direction shown in FIG. 1), and the right hand of the user is placed on a lower surface of the one controller (the side surface further in the negative y-axis direction shown in FIG. 1). Thus, in the horizontally-held operation, an operation can be performed using the operation buttons and the stick provided on the main surface of the held controller. Further, in the horizontally-held operation, an operation can be performed using the operation buttons (e.g., the second L-button 43, the second R-button 44, the second L-button 65, the second R-button 66, and the like) provided on the side surface that is in contact with the main body apparatus 2 when the held controller is attached to the main body apparatus 2.

As an example, when the user performs the horizontally-held operation by holding the left controller 3 with both hands, an operation is performed using the operation buttons and the stick provided in the left controller 3. For example, when the left direction button 36 of the left controller 3 is subjected to a pressing operation, the player object PO throws a left punch, and the first object G1 starts moving. When the down direction button 34 of the left controller 3 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the right direction button 33 of the left controller 3 is subjected to a pressing operation, the player object PO performs the action of jumping in the virtual game world. Then, when the up direction button 35 of the left controller 3 is subjected to a pressing operation, the player object PO dashes (moves rapidly) in the virtual game world.

As another example, when the user performs the horizontally-held operation by holding the right controller 4 with both hands, an operation is performed using the operation buttons and the stick provided in the right controller 4. For example, when the A-button 53 of the right controller 4 is subjected to a pressing operation, the player object PO throws a left punch, and the first object G1 starts moving. When the X-button 55 of the right controller 4 is subjected to a pressing operation, the player object PO throws a right punch, and the second object G2 starts moving. When the analog stick 52 of the right controller 4 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 52 of the right controller 4 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 52 of the right controller 4 is performed in a case where both the first object G1 and the second object G2 are placed at the movement start positions, the player object PO defends against an attack from the enemy object EO in the virtual game world. When the Y-button 56 of the right controller 4 is subjected to a pressing operation, the player object PO performs the action of jumping in the virtual game world. Then, when the B-button 54 of the right controller 4 is subjected to a pressing operation, the player object PO dashes (moves rapidly) in the virtual game world.

FIG. 19 is an example of an operation correspondence table indicating the actions of the player object PO for operation contents in each of the above operation methods (the vertically-held operation method, the extension grip operation method, and the horizontally-held operation method).

As is clear from FIG. 19, even when the user wishes to cause the player object PO to perform the same action, it may be necessary to perform a different operation due to the fact that the operation method is different. For example, when the user wishes to cause the player object PO to move in the front, back, left, and right directions, then in the vertically-held operation method, it is necessary to perform the operation of tilting the left controller 3 and the right controller 4 in the direction in which the user wishes to cause the player object PO to move. In the extension grip operation method and the horizontally-held operation method, however, it is necessary to perform an tilt operation on a stick. Further, when the user wishes to cause the player object PO to move in the front, back, left, and right directions, a stick for use in the operation is different between the extension grip operation method and the horizontally-held operation method using the right controller 4. Further, when the user wishes to cause the player object PO to move in the front, back, left, and right directions, the direction in which the analog stick 32 is tilted is different between the extension grip operation method and the horizontally-held operation method using the left controller 3. Specifically, when the user wishes to cause the player object PO to move to the left or right, then in the extension grip operation method, it is necessary to tilt the analog stick 32 in the positive x-axis direction or the negative x-axis direction. In the horizontally-held operation method using the left controller 3, however, it is necessary to tilt the analog stick 32 in the positive y-axis direction or the negative y-axis direction. Further, when the user wishes to cause the player object PO to move forward or backward, then in the extension grip operation method, it is necessary to tilt the analog stick 32 in the positive y-axis direction or the negative y-axis direction. In the horizontally-held operation method using the left controller 3, however, it is necessary to tilt the analog stick 32 in the negative x-axis direction or the positive x-axis direction. Further, these operation contents have similar differences also in a case where the moving directions of the first object G1 and/or the second object G2 are changed.

Further, when the user causes the player object PO to perform the action of throwing a left punch or a right punch, then in the vertically-held operation method, it is necessary to perform the operation of swinging the left controller 3 or the right controller 4. In the extension grip operation method and the horizontally-held operation method, however, it is necessary to perform the operation of pressing operation buttons assigned as described above. Then, an operation button assigned in a case where the user causes the player object PO to perform the action of throwing a left punch or a right punch is different also between the extension grip operation method and the horizontally-held operation method. Further, when the user causes the player object PO to perform the action of jumping or dashing, an operation button assigned to each operation method is different.

Further, as is clear from FIG. 19, even when the same operation is performed using the left controller 3 and/or the right controller 4, the corresponding action of the player object PO may be different due to the fact that the operation method is different. For example, between when a tilt operation is performed on the analog stick 32 in the extension grip operation method and when a tilt operation is performed on the analog stick 32 in the horizontally-held operation method using the left controller 3, the direction in which the player object PO moves is different, even if the operation of tilting the stick in the same direction is performed. Further, when the B-button 54 is subjected to a pressing operation in the extension grip operation method, the player object PO performs the action of throwing a left punch. However, when the B-button 54 is subjected to a pressing operation in the horizontally-held operation method using the right controller 4, the player object PO performs the action of dashing. When the A-button 53 is subjected to a pressing operation in the extension grip operation method, the player object PO performs the action of throwing a right punch. However, when the A-button 53 is subjected to a pressing operation in the horizontally-held operation method using the right controller 4, the player object PO performs the action of throwing a left punch. When the X-button 55 is subjected to a pressing operation in the extension grip operation method, the player object PO performs the action of jumping. However, when the X-button 55 is subjected to a pressing operation in the horizontally-held operation method using the right controller 4, the player object PO performs the action of throwing a right punch. Then, when the Y-button 56 is subjected to a pressing operation in the extension grip operation method, the player object PO performs the action of dashing. However, when the Y-button 56 is subjected to a pressing operation in the horizontally-held operation method using the right controller 4, the player object PO performs the action of jumping.

Further, in the exemplary embodiment, also when the user performs game play by holding one of the left controller 3 and the right controller 4 by the horizontally-held operation method, a vibration is imparted to the held one of the left controller 3 and the right controller 4 in accordance with the situation of this game. As described above, the left controller 3 includes the vibrator 107, and the right controller 4 includes the vibrator 117. The CPU 81 of the main body apparatus 2 transmits vibration data to one of the left controller 3 and the right controller 4 in accordance with the situation of an executed game and thereby can vibrate the vibrator 107 or the vibrator 117 at an amplitude and a frequency corresponding to the vibration data.

Figure 20:
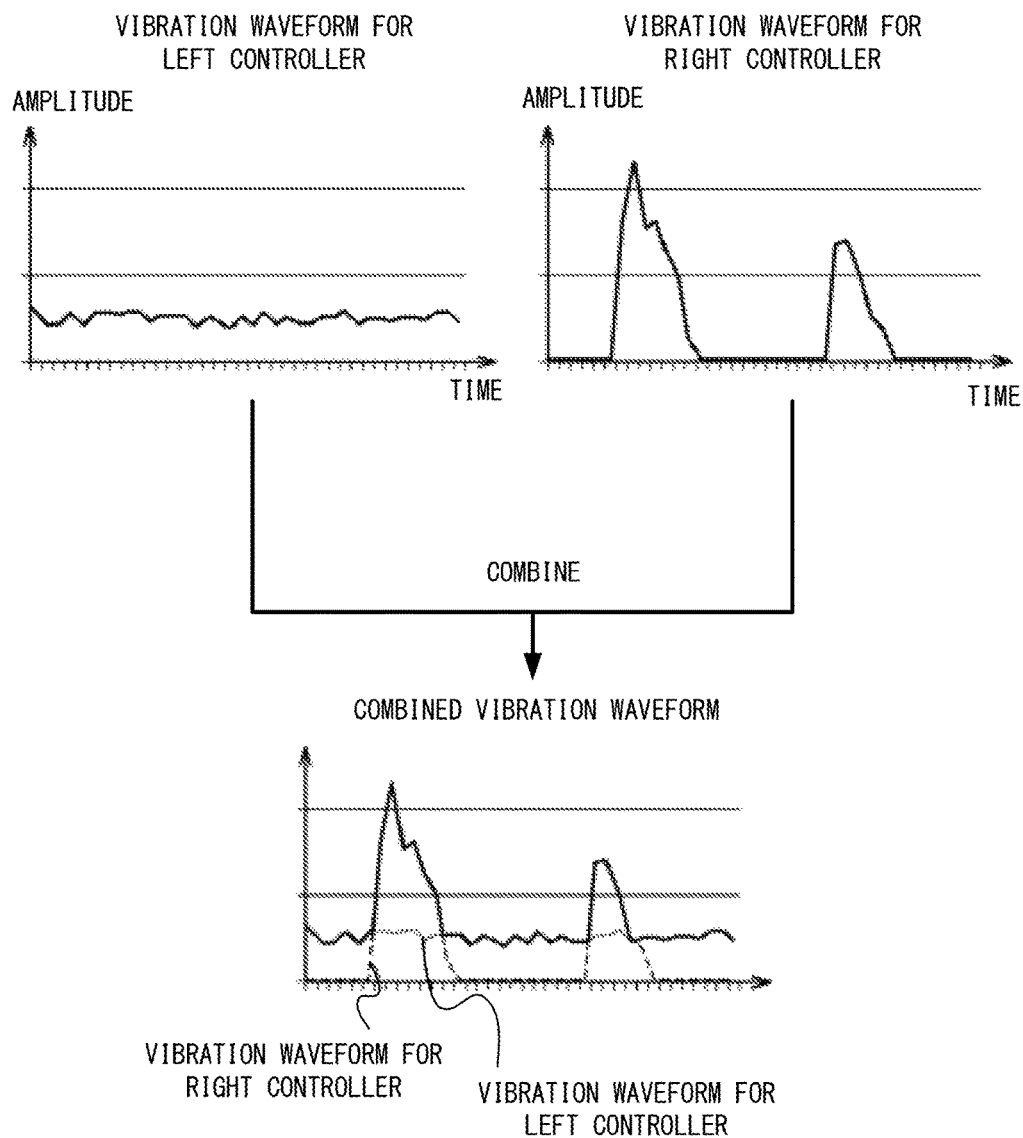
FIG. 20 is a diagram illustrating a non-limiting example of a method for generating vibration data by a selection method.

Here, vibration data for vibrating one of the left controller 3 and the right controller 4 held by the horizontally-held operation method is generated based on vibration data for vibrating the left controller 3 and vibration data for vibrating the right controller 4 in the vertically-held operation method or the extension grip operation method. That is, when game play is performed using a single controller, vibrations imparted to respective controllers when game play is performed using two controllers are combined into a single vibration, and the single vibration is imparted to the single controller. For example, examples of a method for generating vibration data for vibrating a single controller include a selection method and an addition method. With reference to FIGS. 20 to 22, a description is given below of methods for generating vibration data. It should be noted that FIG. 20 is a diagram illustrating an example of a method for generating vibration data by the selection method. FIG. 21 is a diagram showing an example of a combining module for use when a high-frequency side and a low-frequency side are collectively determined. FIG. 22 is a diagram illustrating an example of a method for generating vibration data by the addition method.

When vibration data is generated by the selection method, either one of vibration data for vibrating the left controller 3 and vibration data for vibrating the right controller 4 is selected every predetermined time. Specifically, when vibration data for vibrating the left controller 3 and vibration data for vibrating the right controller 4 are input, then based on the amplitude of a vibration waveform for the left controller indicated by the vibration data for vibrating the left controller 3 and the amplitude of a vibration waveform for the right controller indicated by the vibration data for vibrating the right controller 4, vibration data indicating the vibration waveform having a greater amplitude is selected every predetermined time. Vibration data is thus selected by the selection method, whereby it is possible to preferentially generate a vibration that can be remarkably perceived by the user.

FIG. 20 shows a case where a vibration waveform for the left controller and a vibration waveform for the right controller are input. The vibration waveform for the left controller indicates a relatively weak and continuous vibration, and the vibration waveform for the right controller indicates a relatively strong and short vibration. For example, when vibration data is generated by the selection method, it is determined which vibration waveform has a greater amplitude every predetermined period (e.g., 5 msec to several tens of msec), vibration data indicating the vibration waveform having a greater amplitude is selected and output. Thus, in the selection method, a combined vibration waveform is generated based on a vibration waveform selected every predetermined period, and vibration data indicating the combined vibration waveform is output.

It should be noted that when vibration data is selected by the selection method, vibration data to be selected may be determined also taking into account the frequency of a vibration waveform indicated by the vibration data. For example, when input vibration data is indicated by the combination of a vibration waveform of a high-frequency band and a vibration waveform of a low-frequency band, a method for independently determining each of the high-frequency side and the low-frequency side, and a method for determining the high-frequency side and the low-frequency side by weighting one of the high-frequency side and the low-frequency side are possible. In the first method, when a vibration waveform for the left controller and a vibration waveform for the right controller are input, then based on the amplitude of the vibration waveform for the left controller on the high-frequency side and the amplitude of the vibration waveform for the right controller on the high-frequency side, vibration data indicating a vibration waveform having a greater amplitude is selected as vibration data on the high-frequency side every predetermined time. Further, when a vibration waveform for the left controller and a vibration waveform for the right controller are input, then based on the amplitude of the vibration waveform for the left controller on the low-frequency side and the amplitude of the vibration waveform for the right controller on the low-frequency side, vibration data indicating a vibration waveform having a greater amplitude is selected as vibration data on the low-frequency side every predetermined time. In the second method, after the amplitude of each frequency band is weighted, a vibration waveform indicating the greatest amplitude is selected every predetermined period, and between the input vibration waveform for the left controller and the input vibration waveform for the right controller, vibration data indicating a vibration waveform including the selected vibration waveform is selected.

Further, when input vibration data is indicated by the combination of a vibration waveform of a high-frequency band and a vibration waveform of a low-frequency band, it is possible to collectively determine the high-frequency side and the low-frequency side. In FIG. 21, the above combining module compares an amplitude obtained by combining an amplitude $\alpha 1L$ on the low-frequency side and an amplitude $\alpha 1H$ on the high-frequency side of the vibration waveform for the left controller, with an amplitude obtained by combining an amplitude $\alpha 2L$ on the low-frequency side and an amplitude $\alpha 2H$ on the high-frequency side of the vibration waveform for the right controller (i.e., a function max ($\alpha 1L+\alpha 1H$, $\alpha 2L+\alpha 2H$)), and outputs as a combined vibration waveform a vibration waveform indicating a greater amplitude in the comparison. That is, based on a value ($\alpha 1L+\alpha 1H$) calculated from a first amplitude ($\alpha 1L$) and a second amplitude ($\alpha 1H$) included in the vibration waveform for the left controller, and a value ($\alpha 2L+\alpha 2H$) calculated from a first amplitude ($\alpha 2L$) and a second amplitude ($\alpha 2H$) included in the vibration waveform for the right controller, the combining module selectively outputs either of the vibration waveforms.

As described above, when a plurality of vibration data for vibrating the left controller 3 and a plurality of vibration data for vibrating the right controller 4 are input, then based on the total of the amplitudes indicated by the plurality of vibration data for vibrating the left controller 3 and the total of the amplitudes indicated by the plurality of vibration data for vibrating the right controller 4, a plurality of vibration data having a larger total of the amplitudes are selected every predetermined period. Thus, between the vibration waveform for the left controller and the vibration waveform for the right controller, a greater amplitude is selected as a whole. Thus, it is possible to impart vibration stimulus to the user while maintaining the characteristics of the entirety of input vibration waveforms.

Further, in the selection method shown in FIG. 21, evaluation may be made by weighting the amplitude of an input vibration pattern based on the frequency. Generally, a human being is sensitive to a vibration on the low-frequency side. Thus, for example, the amplitude on the low-frequency side may be multiplied by a weighting coefficient (e.g., b>1) greater than the amplitude on the high-frequency side. In this case, using a function max ($bX\alpha 1L+\alpha 1H$, $bX\alpha 2L+\alpha 2H$), it may be determined which amplitude is greater.

Further, the configuration may be such that without regard to the difference between a frequency f1L on the low-frequency side of the vibration waveform for the left controller and a frequency f2L on the low-frequency side of the vibration waveform for the right controller, and the difference between a frequency f1H on the high-frequency side of the vibration waveform for the left controller and a frequency f2H on the high-frequency side of the vibration waveform for the right controller, only the amplitudes of the vibration waveforms may be compared.

Further, a predetermined number of frequency components may be selected, based on the magnitudes of the amplitudes, from frequency components included in the vibration waveform for the left controller and the vibration waveform for the right controller. That is, the top two frequency components may be extracted from the amplitude $\alpha 1L$ on the low-frequency side of the vibration waveform for the left controller, the amplitude $\alpha 1H$ on the high-frequency side of the vibration waveform for the left controller, the amplitude $\alpha 2L$ on the low-frequency side of the vibration waveform for the right controller, and the amplitude $\alpha 2H$ on the high-frequency side of the vibration waveform for the right controller, and output as a combined vibration waveform.

Further, when vibration data is selected by the selection method, vibration data to be selected may be determined based on a parameter different from the amplitude of a vibration waveform indicated by the vibration data. For example, based on the frequency of a vibration waveform indicated by vibration data, vibration data indicating the vibration waveform having a smaller frequency may be selected every predetermined time.

As shown in FIG. 22, when vibration data is generated by the addition method, vibration waveforms of vibration data for vibrating the left controller 3 and vibration data for vibrating the right controller 4 are superimposed on each other every predetermined time. Specifically, when vibration data for vibrating the left controller 3 and vibration data for vibrating the right controller 4 are input, a combined vibration waveform is generated by superimposing a vibration waveform for the left controller indicated by the vibration data for vibrating the left controller 3 and a vibration waveform for the right controller indicated by the vibration data for vibrating the right controller 4 on each other every predetermined time, and vibration data indicating the combined vibration waveform is generated. Specifically, it is possible to generate a combined vibration waveform by adding the amplitudes of vibration waveforms input every predetermined cycle. In this case, a vibration waveform for the left controller and a vibration waveform for the right controller are coupled together on a time axis. Vibration data is thus generated by the addition method, whereby, for example, in the situation where a plurality of vibrations of similar types can frequently overlap each other as shown in FIG. 21, it is possible to cause the user to perceive vibrations overlapping each other without lacking the plurality of vibrations of similar types.

Here, when vibration data is combined by the addition method, the frequency of a combined vibration waveform is calculated based on the frequency of a vibration waveform for the left controller and the frequency of a vibration waveform for the right controller. As a first example, among an input vibration waveform for the left controller and an input vibration waveform for the right controller, the frequency of a vibration waveform having the greatest amplitude is adopted. As a second example, the average value of the frequency of an input vibration waveform for the left controller and the frequency of an input vibration waveform for the right controller is adopted. As a third example, after the frequency of an input vibration waveform for the left controller and the frequency of an input vibration waveform for the right controller are weighted based on the respective amplitudes (e.g., a weighted average corresponding to the amplitude), the frequency is calculated based on the first example or the second example.

It should be noted that when vibration data is combined by the addition method, it is possible to generate a combined vibration waveform by adding the amplitudes of vibration waveforms input every predetermined cycle. Alternatively, a combined vibration waveform may be generated by averaging the amplitudes of vibration waveforms. Further, when a combined vibration waveform is generated by averaging the amplitudes of vibration waveforms, the amplitudes weighted based on the frequencies of the respective vibration waveforms may be averaged.

As described above, even when an operation is performed using one of the left controller 3 and the right controller 4 by the horizontally-held operation method, a vibration is generated based on a vibration to be imparted when an operation is performed using both the left controller 3 and the right controller 4. Thus, the user performing an operation by the horizontally-held operation method can perceive a vibration based on the same vibration data as a vibration by another operation method. Thus, it is possible to prevent interest by an operation method from being impaired.

Further, in the above description, examples have been used where vibration data for vibrating a single controller is generated by the selection method and the addition method. Alternatively, the vibration data may be generated using another method. For example, when a vibration synchronized with a sound is imparted to each of the left controller 3 and the right controller 4 in the vertically-held operation method or the extension grip operation method, then in the horizontally-held operation method, a vibration based on a combined sound obtained by combining these sounds may be imparted to one of the left controller 3 and the right controller 4. Specifically, in the vertically-held operation method or the extension grip operation method, vibration data for vibrating the left controller 3 is generated based on sound data indicating a sound (e.g., a movement sound, a collision sound, a breaking sound, or the like) involved in the movement of the first object G1 in the virtual game world, and vibration data for vibrating the right controller 4 is generated based on a sound data indicating a sound (e.g., a movement sound, a collision sound, a breaking sound, or the like) involved in the movement of the second object G2 in the virtual game world. In this case, in the horizontally-held operation method, combined sound data obtained by combining the sound involved in the movement of the first object G1 and the sound involved in the movement of the second object G2 is generated, and based on the combined sound data, vibration data for vibrating one of the left controller 3 and the right controller 4 is generated.

Next, with reference to FIGS. 23 to 27, a description is given of an example of specific processing executed by the information processing system 1 according to the exemplary embodiment. FIG. 23 is a diagram showing an example of a data area set in the DRAM 85 of the main body apparatus 2 according to the exemplary embodiment. It should be noted that in the DRAM 85, in addition to data shown in FIG. 23, data used for other processes is also stored, but is not described in detail here.

In a program storage area of the DRAM 85, various programs Pa, which are executed by the information processing system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the information processing system 1 (e.g., the first type storage medium attached to the first slot 23 or the second type storage medium attached to the second slot 24) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various data used for processes such as a communication process, information processing, and the like executed by the information processing system 1 is stored. In the exemplary embodiment, in the DRAM 85, operation data Da, orientation data Db, angular velocity data Dc, acceleration data Dd, operation method data De, left controller vibration data Df, right controller vibration data Dg, combined vibration data Dh, operation correspondence table data Di, player object position data Dj, enemy object position data Dk, image data Dm, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and/or the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the information processing system 1, or is updated every cycle in which operation data is transmitted through the above wireless communication.

The orientation data Db is data indicating each of the orientations of the left controller 3 and the right controller 4 with respect to the direction of a gravitational acceleration in real space. For example, the orientation data Db includes data indicating the direction of a gravitational acceleration acting on each of the left controller 3 and the right controller 4, data indicating xyz-axis directions relative to the direction of the gravitational acceleration, and the like.

The angular velocity data Dc is data indicating angular velocities generated in each of the left controller 3 and the right controller 4. For example, the angular velocity data Dc includes data indicating angular velocities about the xyz axes generated in each of the left controller 3 and the right controller 4 and the like.

The acceleration data Dd is data indicating accelerations generated in each of the left controller 3 and the right controller 4. For example, the acceleration data Dd includes data indicating accelerations generated in the xyz-axis directions, except for the gravitational acceleration generated in each of the left controller 3 and the right controller 4.

The operation method data De is data indicating an operation method (e.g., the vertically-held operation method, the extension grip operation method, or the horizontally-held operation method) selected and set by the user.

The left controller vibration data Df is data indicating a vibration for vibrating the left controller 3. The right controller vibration data Dg is data indicating a vibration for vibrating the right controller 4. The combined vibration data Dh is data indicating a vibration for vibrating one of the left controller 3 and the right controller 4 when the horizontally-held operation method is set.

The operation correspondence table data Di is data indicating the operation correspondence table (see FIG. 19) in which the contents of instructions to be given corresponding to operations are described with respect to each operation method.

The player object position data Dj is data indicating each of the positions and the directions (the moving directions) in the virtual space of the first object G1, the second object G2, and the player object PO. The enemy object position data Dk is data indicating the position and the direction in the virtual space of the enemy object EO and data indicating the positions and the directions in the virtual space of objects shot from the enemy object EO (e.g., objects representing the left glove (the left fist) and the right glove (the right fist)).

The image data Dm is data for displaying an image (e.g., an image of a virtual object, a field image, or a background image) on the display 12 of the main body apparatus 2 or the display screen of the stationary monitor 6 when a game is performed.

Figure 24:
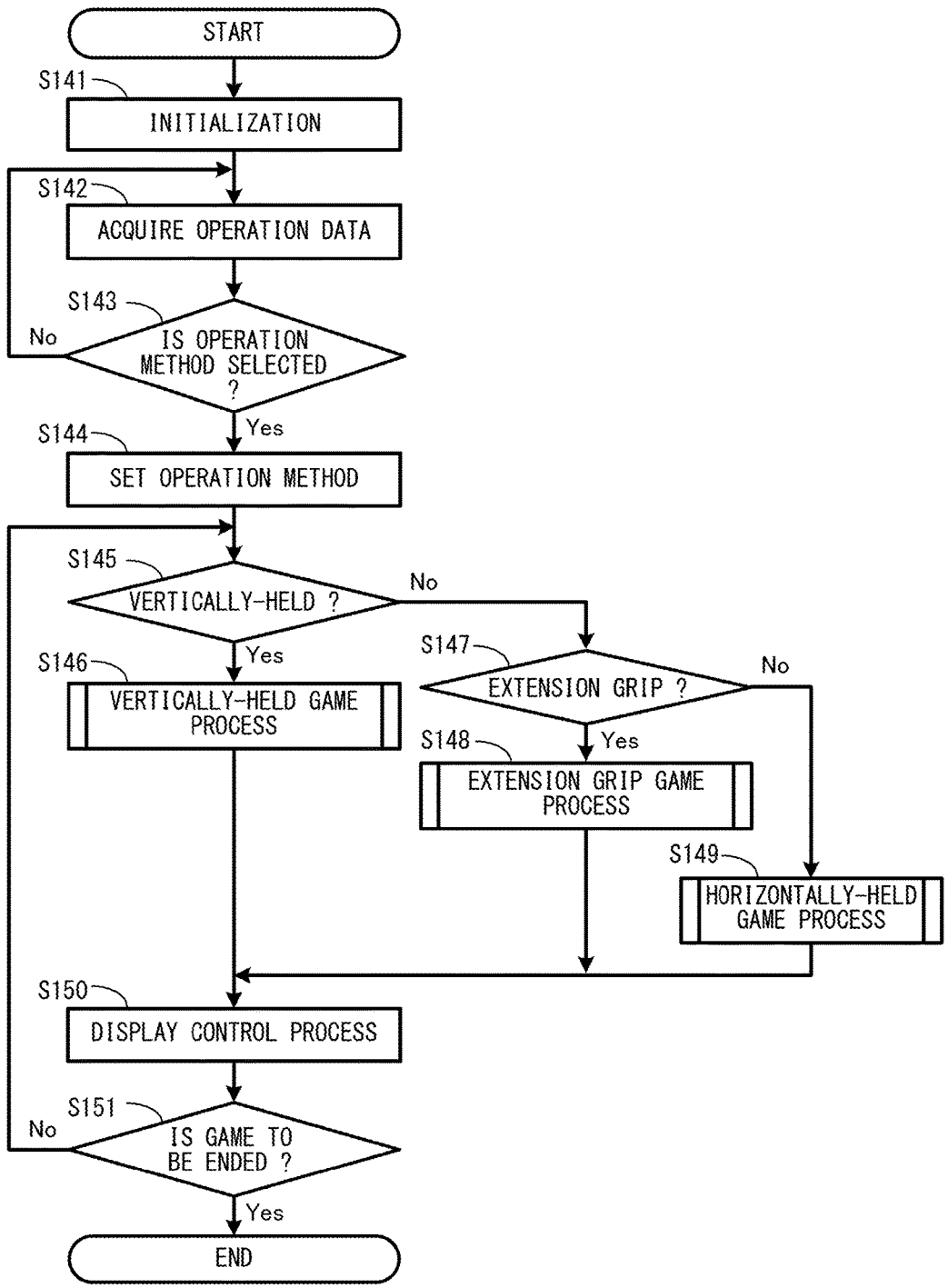
FIG. 24 is a flow chart showing a non-limiting example of game processing executed by the information processing system 1.
Figure 25:
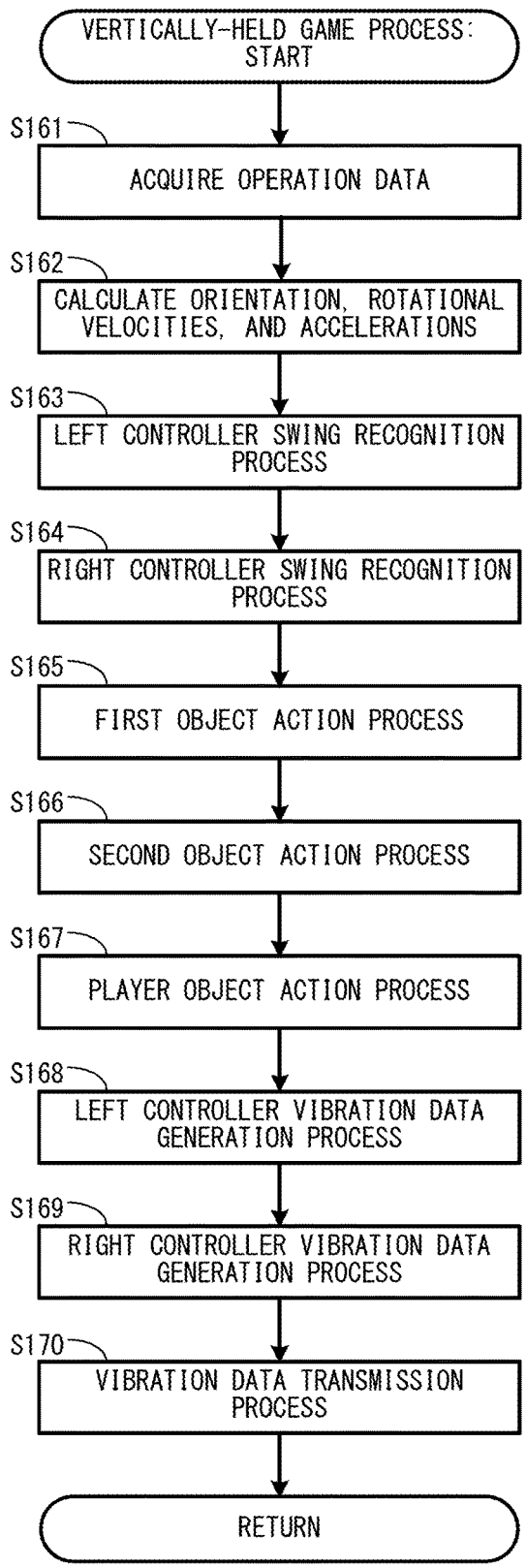
FIG. 25 is a subroutine showing a non-limiting example of the details of a vertically-held game process performed in step S146 in FIG. 24.
Figure 27:
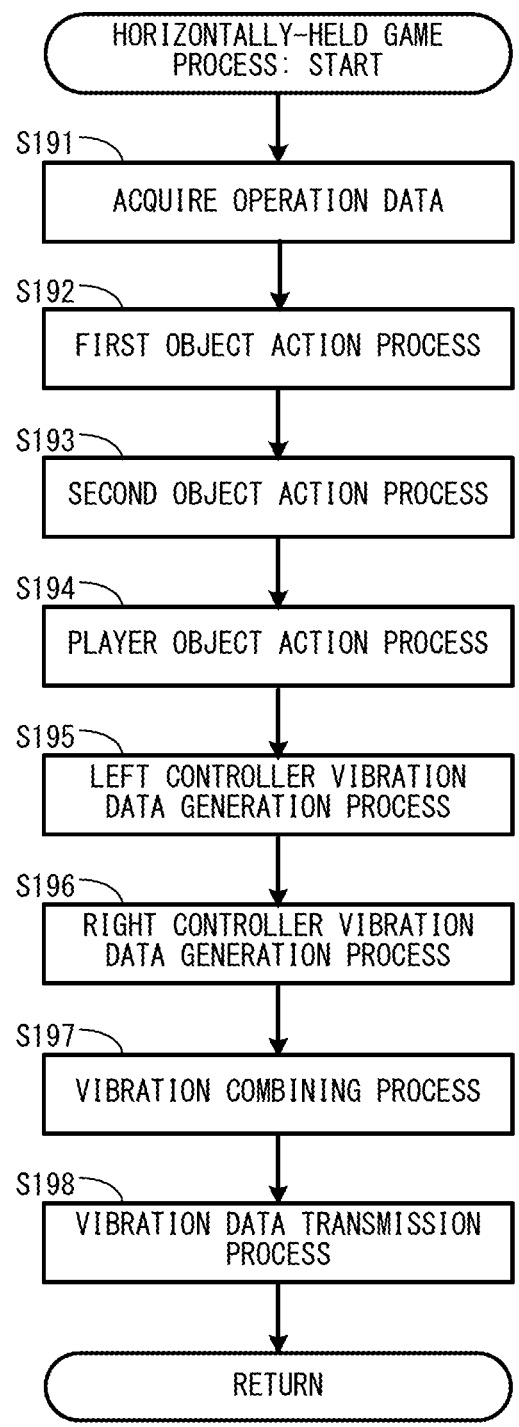
FIG. 27 is a subroutine showing a non-limiting example of the details of a horizontally-held game process performed in step S149 in FIG. 24.

Next, with reference to FIGS. 24 to 27, a detailed example of information processing (game processing) according to the exemplary embodiment is described. FIG. 24 is a flow chart showing an example of game processing executed by the information processing system 1. FIG. 25 is a subroutine showing an example of the details of a vertically-held game process performed in step S146 in FIG. 24. FIG. 26 is a subroutine showing an example of the details of an extension grip game process performed in step S148 in FIG. 24. FIG. 27 is a subroutine showing an example of the details of a horizontally-held game process performed in step S149 in FIG. 24. In the exemplary embodiment, a series of processes shown in FIGS. 24 to 27 is performed by the CPU 81 executing the communication program and a predetermined application program (a game program) included in the various programs Pa. Further, the game processing shown in FIGS. 24 to 27 is started at any timing.

It should be noted that the processes of all of the steps in the flow charts shown in FIGS. 24 to 27 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 24 to 27 may be executed by the cooperation of a plurality of information processing apparatuses including the main body apparatus 2.

In FIG. 24, the CPU 81 performs initialization in the game processing (step S141), and the processing proceeds to the next step. For example, in the initialization, the CPU 81 initializes parameters for performing the processing described below. Further, in the initialization, the CPU 81 sets a game field for performing game play and sets the initial positions of the player object PO and the enemy object EO on the game field, thereby updating the player object position data Dj and the enemy object position data Dk. Further, the CPU 81 initializes the moving directions of the first object G1 and the second object G2 to default values (e.g., front directions), thereby updating the player object position data Dj.

Next, the CPU 81 acquires operation data from the left controller 3 and/or the right controller 4 and updates the operation data Da (step S142), and the processing proceeds to the next step.

Next, the CPU 81 determines whether or not an operation method is selected by the user (step S143). Then, when an operation method is selected, the processing proceeds to step S144. On the other hand, when an operation method is not selected, the CPU 81 repeats the process of step S142 and waits for the user to select an operation method.

In the process of the above step S143, as an example, when the operation data acquired in the above step S142 corresponds to any of the specific operations set for each of the plurality of operation methods, the CPU 81 determines that an operation method is selected. For example, when the operation of simultaneously pressing the first L-button 38 of the left controller 3 and the first R-button 60 of the right controller 4 is performed, the CPU 81 determines that the vertically-held operation method is selected. Further, when the operation of simultaneously pressing the ZL-button 39 of the left controller 3 and the ZR-button 61 of the right controller 4 is performed, the CPU 81 determines that the extension grip operation method is selected. Further, when the operation of simultaneously pressing the second L-button 43 and the second R-button 44 of the left controller 3 is performed, the CPU 81 determines that the horizontally-held operation method using the left controller 3 is selected. When the operation of simultaneously pressing the second L-button 65 and the second R-button 66 of the right controller 4 is performed, the CPU 81 determines that the horizontally-held operation method using the right controller 4 is selected.

As another example, the CPU 81 displays options urging the user to select an operation method on the display 12 of the main body apparatus 2 or the display screen of the stationary monitor 6. When the operation data acquired in the above step S142 indicates the operation of selecting any one of the options, the CPU 81 determines that an operation method is selected. For example, the CPU 81 displays options for the user to select the vertically-held operation method, the extension grip operation method, and the horizontally-held operation method on the display 12 of the main body apparatus 2 or the display screen of the stationary monitor 6, thereby urging the user to select any one of the options.

In step S144, the CPU 81 sets the operation method, and the processing proceeds to the next step. For example, the CPU 81 updates the operation method data De using data indicating the operation method selected in the above step S143.

Next, the CPU 81 determines whether or not the vertically-held operation method is selected (step S145). Then, when the vertically-held operation method is selected, the processing proceeds to step S146. On the other hand, when the vertically-held operation method is not selected, the processing proceeds to step S147.

In step S146, the CPU 81 performs a game process by the vertically-held operation method, and the processing proceeds to step S150. With reference to FIG. 25, the game process by the vertically-held operation method is described below.

In FIG. 25, the CPU 81 acquires operation data from the left controller 3 and the right controller 4 and updates the operation data Da (step S161), and the processing proceeds to the next step.

Next, the CPU 81 calculates the orientation, the angular velocities, and the accelerations of each of the left controller 3 and the right controller 4 (step S162), and the processing proceeds to the next step. For example, the CPU 81 acquires data indicating accelerations generated in each of the left controller 3 and the right controller 4 from the operation data Da, calculates the direction of a gravitational acceleration acting on each of the left controller 3 and the right controller 4, and updates the orientation data Db using data indicating the direction. As a method for extracting a gravitational acceleration, any method may be used. For example, an acceleration component generated on average in each of the left controller 3 and the right controller 4 may be calculated and extracted as a gravitational acceleration. Then, the CPU 81 calculates, as the orientation of the left controller 3, the xyz-axis directions of the left controller 3 with respect to the direction of the gravitational acceleration calculated for the left controller 3 and updates the orientation data Db using data indicating the orientation. Further, the CPU 81 calculates, as the orientation of the right controller 4, the xyz-axis directions of the right controller 4 with respect to the direction of the gravitational acceleration calculated for the right controller 4 and updates the orientation data Db using data indicating the orientation. Further, the CPU 81 acquires data indicating angular velocities generated in each of the left controller 3 and the right controller 4 from the operation data Da, calculates angular velocities about the xyz axes of each of the left controller 3 and the right controller 4, and updates the angular velocity data Dc using data indicating the angular velocities. Further, the CPU 81 acquires data indicating accelerations generated in each of the left controller 3 and the right controller 4 from the operation data Da, removes the gravitational acceleration component from the accelerations in the xyz-axis directions generated in each of the left controller 3 and the right controller 4, and updates the acceleration data Dd using data indicating the accelerations after the removal.

It should be noted that after the xyz-axis directions with respect to the gravitational acceleration are calculated, the orientation of the left controller 3 or the right controller 4 may be updated in accordance with only the angular velocities about the xyz axes. However, to prevent the relationship between the orientation of the left controller 3 or the right controller 4 and the direction of the gravitational acceleration from shifting due to erroneous accumulation, the xyz-axis directions relative to the direction of the gravitational acceleration may be calculated every predetermined cycle, and the orientation of the left controller 3 or the right controller 4 may be corrected.

Next, the CPU 81 performs a left controller swing recognition process (step S163), and the processing proceeds to the next step. For example, with reference to the acceleration data Dd, when the magnitude of an xy acceleration generated in the left controller 3 at the current moment is greater than a threshold for a swing determination regarding the left controller 3, the CPU 81 determines that the left controller 3 is swung. Here, the xy acceleration is an acceleration obtained by removing a z-axis direction component (i.e., a horizontal direction component of the left controller 3 in an operation by the vertically-held operation method described with reference to FIGS. 11 to 16) from accelerations generated in the left controller 3.

Next, the CPU 81 performs a right controller swing recognition process (step S164), and the processing proceeds to the next step. For example, with reference to the acceleration data Dd, when the magnitude of an xy acceleration generated in the right controller 4 at the current moment is greater than a threshold for a swing determination regarding the right controller 4, the CPU 81 determines that the right controller 4 is swung. Here, the xy acceleration is an acceleration obtained by removing a z-axis direction component (i.e., a horizontal direction component of the right controller 4 in an operation by the vertically-held operation method described with reference to FIGS. 11 to 16) from accelerations generated in the right controller 4.

Next, the CPU 81 performs a first object action process (step S165), and the processing proceeds to the next step. For example, in accordance with the determination in the above step S163 that the left controller 3 is swung, the CPU 81 starts the movement of the first object G1 from the movement start position. Then, in accordance with the tilt in the z-axis direction of the left controller 3 relative to the direction of the gravitational acceleration, the CPU 81 changes the moving direction of the first object G1. Specifically, the CPU 81 acquires the orientation of the left controller 3 with reference to the orientation data Db and calculates the tilt in the z-axis direction of the left controller 3 relative to the direction of the gravitational acceleration. Further, in accordance with the angular velocity of the left controller 3 about the direction of the gravitational acceleration, the CPU 81 changes the moving direction of the first object G1. Specifically, with reference to the angular velocity data Dc, the CPU 81 acquires angular velocities about the xyz axes generated in the left controller 3, and based on the acquired angular velocities, the CPU 81 calculates the angular velocity of the left controller 3 about the direction of the gravitational acceleration. Then, based on the moving direction and the movement algorithm of the first object G1, the CPU 81 continues the movement of the first object G1 until the first object G1 returns to the movement start position. For example, with reference to the player object position data Dj, the CPU 81 acquires the position and the moving direction of the first object G1, and based on the moving direction and the movement algorithm, the CPU 81 causes the first object G1 to move from the acquired position of the first object G1. Then, the CPU 81 updates the player object position data Dj using the position of the first object G1 after the movement. It should be noted that when the first object G1 is moving on a homeward path in the virtual space for returning to the movement start position, the CPU 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the CPU 81 performs a second object action process (step S166), and the processing proceeds to the next step. For example, in accordance with the determination in the above step S164 that the right controller 4 is swung, the CPU 81 starts the movement of the second object G2 from the movement start position. Then, in accordance with the tilt in the z-axis direction of the right controller 4 relative to the direction of the gravitational acceleration, the CPU 81 changes the moving direction of the second object G2. Specifically, the CPU 81 acquires the orientation of the right controller 4 with reference to the orientation data Db and calculates the tilt in the z-axis direction of the right controller 4 relative to the direction of the gravitational acceleration. Further, in accordance with the angular velocity of the right controller 4 about the direction of the gravitational acceleration, the CPU 81 changes the moving direction of the second object G2. Specifically, with reference to the angular velocity data Dc, the CPU 81 acquires angular velocities about the xyz axes generated in the right controller 4, and based on the angular velocities, the CPU 81 calculates the angular velocity of the right controller 4 about the direction of the gravitational acceleration. Then, based on the moving direction and the movement algorithm of the second object G2, the CPU 81 continues the movement of the second object G2 until the second object G2 returns to the movement start position. For example, with reference to the player object position data Dj, the CPU 81 acquires the position and the moving direction of the second object G2, and based on the moving direction and the movement algorithm, the CPU 81 causes the second object G2 to move from the acquired position of the second object G2. Then, the CPU 81 updates the player object position data Dj using the position of the second object G2 after the movement. It should be noted that when the second object G2 is moving on a homeward path in the virtual space for returning to the movement start position, the CPU 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the CPU 81 performs a player object action process (step S167), and the processing proceeds to the next step. For example, based on the description of the operation correspondence table indicated by the operation correspondence table data Di, the CPU 81 sets the content of an instruction indicated by the operation data acquired in the above step S161, and in accordance with the set content of the instruction, the CPU 81 causes the player object PO to perform an action, thereby updating the player object position data Dj. That is, with reference to the orientation data Db, when both the left controller 3 and the right controller 4 are tilted to the left, the CPU 81 causes the player object PO to move to the left at a moving velocity corresponding to the tilt angle, thereby updating the player object position data Dj. With reference to the orientation data Db, when both the left controller 3 and the right controller 4 are tilted to the right, the CPU 81 causes the player object PO to move to the right at a moving velocity corresponding to the tilt angle, thereby updating the player object position data Dj. With reference to the orientation data Db, when both the left controller 3 and the right controller 4 are tilted forward, the CPU 81 causes the player object PO to move forward at a moving velocity corresponding to the tilt angle, thereby updating the player object position data Dj. With reference to the orientation data Db, when both the left controller 3 and the right controller 4 are tilted backward, the CPU 81 causes the player object PO to move backward at a moving velocity corresponding to the tilt angle, thereby updating the player object position data Dj. Then, with reference to the orientation data Db, when both the left controller 3 and the right controller 4 are tilted inward, and if the first object G1 and the second object G2 are placed at the movement start positions, the CPU 81 causes the player object PO to perform a defense action. Further, with reference to the operation data Da, when the first L-button 38 is pressed, the CPU 81 causes the player object PO to move dashing, thereby updating the player object position data Dj. Further, with reference to the operation data Da, when the first R-button 60 is pressed, the CPU 81 causes the player object PO to jump, thereby updating the player object position data Dj.

Next, the CPU 81 performs the process of generating vibration data for vibrating the left controller 3 (step S168), and the processing proceeds to the next step. For example, the CPU 81 generates a vibration waveform corresponding to the type, the moving velocity, the moving direction, the collision state, and the like of the first object G1, and based on the vibration waveform, the CPU 81 generates vibration data for vibrating the left controller 3, thereby updating the left controller vibration data Df. It should be noted that when the moving velocity or the moving direction of the first object G1 changes or when the first object G1 collides with another object, the CPU 81 may change the amplitude or the frequency to vibrate the left controller 3 in accordance with the change or the degree of impact. Further, the CPU 81 may add a vibration corresponding to the situation of the virtual game world except for the first object G1 to the vibration waveform. For example, the CPU 81 may add to the vibration waveform a vibration corresponding to the action of the player object PO or an impact imparted to the player object PO, a vibration corresponding to the situation of the game field, a vibration corresponding to BGM or a sound effect, or the like.

Next, the CPU 81 performs the process of generating vibration data for vibrating the right controller 4 (step S169), and the processing proceeds to the next step. For example, the CPU 81 generates a vibration waveform corresponding to the type, the moving velocity, the moving direction, the collision state, and the like of the second object G2, and based on the vibration waveform, the CPU 81 generates vibration data for vibrating the right controller 4, thereby updating the right controller vibration data Dg. It should be noted that when the moving velocity or the moving direction of the second object G2 changes or when the second object G2 collides with another object, the CPU 81 may change the amplitude or the frequency to vibrate the right controller 4 in accordance with the change or the degree of impact. Further, the CPU 81 may add a vibration corresponding to the situation of the virtual game world except for the second object G2 to the vibration waveform. For example, the CPU 81 may add to the vibration waveform a vibration corresponding to the action of the player object PO or an impact imparted to the player object PO, a vibration corresponding to the situation of the game field, a vibration corresponding to BGM or a sound effect, or the like.

Next, the CPU 81 performs the process of, in each cycle of transmitting vibration data, transmitting vibration data corresponding to this cycle to the left controller 3 and the right controller 4 (step S170), and the processing of this subroutine ends. For example, with reference to the left controller vibration data Df, the CPU 81 transmits vibration data for a vibration length corresponding to the transmission cycle to the left controller 3. Further, with reference to the right controller vibration data Dg, the CPU 81 transmits vibration data for a vibration length corresponding to the transmission cycle to the right controller 4. The vibration data for each controller is thus transmitted, whereby each of the left controller 3 and the right controller 4 receiving the vibration data vibrates based on vibration waveforms corresponding to the vibration data.

Referring back to FIG. 24, when it is determined in the above step S145 that the vertically-held operation method is not selected, the CPU 81 determines whether or not the extension grip operation method is selected (step S147). Then, when the extension grip operation method is selected, the processing proceeds to step S148. On the other hand, when the extension grip operation method is not selected, the processing proceeds to step S149.

In step S148, the CPU 81 performs a game process by the extension grip operation method, and the processing proceeds to step S150. With reference to FIG. 26, the game process by the extension grip operation method is described below.

In FIG. 26, the CPU 81 acquires operation data from the left controller 3 and the right controller 4 and updates the operation data Da (step S181), and the processing proceeds to the next step.

Next, the CPU 81 performs a first object action process (step S182), and the processing proceeds to the next step. For example, based on the description of the operation correspondence table indicated by the operation correspondence table data Di, the CPU 81 sets the content of an instruction indicated by the operation data acquired in the above step S181, and in accordance with the set content of the instruction, the CPU 81 causes the first object G1 to perform an action, thereby updating the player object position data Dj.

For example, when the operation data acquired in the above step S181 indicates a pressing operation on the B-button 54, the CPU 81 starts the movement of the first object G1 from the movement start position in a predetermined direction, thereby updating the player object position data Dj. Further, when the operation data acquired in the above step S181 indicates a tilt operation on the analog stick 32, and if the first object G1 is moving away from the movement start position in the virtual game world, then in accordance with the direction in which the analog stick 32 is subjected to the tilt operation and the tilt angle, the CPU 81 changes the moving direction or the moving velocity of the first object G1, thereby updating the player object position data Dj. Then, based on the moving direction and the movement algorithm of the first object G1, the CPU 81 continues the movement of the first object G1 until the first object G1 returns to the movement start position. For example, with reference to the player object position data Dj, the CPU 81 acquires the position and the moving direction of the first object G1, and based on the moving direction and the movement algorithm, the CPU 81 causes the first object G1 to move from the acquired position of the first object G1. Then, the CPU 81 updates the player object position data Dj using the position of the first object G1 after the movement. It should be noted that when the first object G1 is moving on the homeward path in the virtual space for returning to the movement start position, the CPU 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the CPU 81 performs a second object action process (step S183), and the processing proceeds to the next step. For example, based on the description of the operation correspondence table indicated by the operation correspondence table data Di, the CPU 81 sets the content of an instruction indicated by the operation data acquired in the above step S181, and in accordance with the set content of the instruction, the CPU 81 causes the second object G2 to perform an action, thereby updating the player object position data Dj.

For example, when the operation data acquired in the above step S181 indicates a pressing operation on the A-button 53, the CPU 81 starts the movement of the second object G2 from the movement start position in a predetermined direction, thereby updating the player object position data Dj. Further, when the operation data acquired in the above step S181 indicates a tilt operation on the analog stick 32, and if the second object G2 is moving away from the movement start position in the virtual game world, then in accordance with the direction in which the analog stick 32 is subjected to the tilt operation and the tilt angle, the CPU 81 changes the moving direction or the moving velocity of the second object G2, thereby updating the player object position data Dj. Then, based on the moving direction and the movement algorithm of the second object G2, the CPU 81 continues the movement of the second object G2 until the second object G2 returns to the movement start position. For example, with reference to the player object position data Dj, the CPU 81 acquires the position and the moving direction of the second object G2, and based on the moving direction and the movement algorithm, the CPU 81 causes the second object G2 to move from the acquired position of the second object G2. Then, the CPU 81 updates the player object position data Dj using the position of the second object G2 after the movement. It should be noted that when the second object G2 is moving on the homeward path in the virtual space for returning to the movement start position, the CPU 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the CPU 81 performs a player object action process (step S184), and the processing proceeds to the next step. For example, based on the description of the operation correspondence table indicated by the operation correspondence table data Di, the CPU 81 sets the content of an instruction indicated by the operation data acquired in the above step S181, and in accordance with the set content of the instruction, the CPU 81 causes the player object PO to perform an action, thereby updating the player object position data Dj. That is, with reference to the operation data Da, when the analog stick 32 is subjected to a tilt operation in the positive x-axis direction, the CPU 81 causes the player object PO to move to the left at a moving velocity corresponding to the tilt angle, thereby updating the player object position data Dj. With reference to the operation data Da, when the analog stick 32 is subjected to a tilt operation in the negative x-axis direction, the CPU 81 causes the player object PO to move to the right at a moving velocity corresponding to the tilt angle, thereby updating the player object position data Dj. With reference to the operation data Da, when the analog stick 32 is subjected to a tilt operation in the positive y-axis direction, the CPU 81 causes the player object PO to move forward at a moving velocity corresponding to the tilt angle, thereby updating the player object position data Dj. With reference to the operation data Da, when the analog stick 32 is subjected to a tilt operation in the negative y-axis direction, the CPU 81 causes the player object PO to move backward at a moving velocity corresponding to the tilt angle, thereby updating the player object position data Dj. Then, with reference to the operation data Da, when the operation of pushing in the analog stick 32 is performed, and if the first object G1 and the second object G2 are placed at the movement start positions, the CPU 81 causes the player object PO to perform a defense action. Further, with reference to the operation data Da, when the Y-button 56 is pressed, the CPU 81 causes the player object PO to move dashing, thereby updating the player object position data Dj. Further, with reference to the operation data Da, when the X-button 55 is pressed, the CPU 81 causes the player object PO to jump, thereby updating the player object position data Dj.

Next, the CPU 81 performs the process of generating vibration data for vibrating the left controller 3 (step S185), and the processing proceeds to the next step. It should be noted that the vibration data generation process in the above step S185 is similar to the vibration data generation process in the above step S168, and therefore is not described in detail here.

Next, the CPU 81 performs the process of generating vibration data for vibrating the right controller 4 (step S186), and the processing proceeds to the next step. It should be noted that the vibration data generation process in the above step S186 is similar to the vibration data generation process in above step S169, and therefore is not described in detail here.

Next, the CPU 81 performs the process of, in each cycle of transmitting vibration data, transmitting vibration data corresponding to this cycle to the left controller 3 and the right controller 4 (step S187), and the processing of this subroutine ends. It should be noted that the vibration data transmission process in the above step S187 is similar to the vibration data transmission process in the above step S170, and therefore is not described in detail here.

Referring back to FIG. 24, when it is determined in the above step S147 that the extension grip operation method is not selected, the processing proceeds to step S149 on the assumption that the horizontally-held operation method is selected. In step S149, the CPU 81 performs a game process by the horizontally-held operation method, and the processing proceeds to step S150. With reference to FIG. 27, the game process by the horizontally-held operation method is described below.

In FIG. 27, the CPU 81 acquires operation data from the left controller 3 or the right controller 4 set as a controller for use in the horizontally-held operation method, thereby updating the operation data Da (step S191), and the processing proceeds to the next step.

Next, the CPU 81 performs a first object action process (step S192), and the processing proceeds to the next step. For example, based on the description of the operation correspondence table indicated by the operation correspondence table data Di, the CPU 81 sets the content of an instruction indicated by the operation data acquired in the above step S191, and in accordance with the set content of the instruction, the CPU 81 causes the first object G1 to perform an action, thereby updating the player object position data Dj.

For example, in the horizontally-held operation method using the left controller 3, when the operation data acquired in the above step S191 indicates a pressing operation on the left direction button 36, the CPU 81 starts the movement of the first object G1 from the movement start position in a predetermined direction, thereby updating the player object position data Dj. Further, when the operation data acquired in the above step S191 indicates a tilt operation on the analog stick 32, and if the first object G1 is moving away from the movement start position in the virtual game world, then in accordance with the direction in which the analog stick 32 is subjected to the tilt operation and the tilt angle, the CPU 81 changes the moving direction or the moving velocity of the first object G1, thereby updating the player object position data Dj.

Further, in the horizontally-held operation method using the right controller 4, when the operation data acquired in the above step S191 indicates a pressing operation on the A-button 53, the CPU 81 starts the movement of the first object G1 from the movement start position in a predetermined direction, thereby updating the player object position data Dj. Further, when the operation data acquired in the above step S191 indicates a tilt operation on the analog stick 52, and if the first object G1 is moving away from the movement start position in the virtual game world, then in accordance with the direction in which the analog stick 52 is subjected to the tilt operation and the tilt angle, the CPU 81 changes the moving direction or the moving velocity of the first object G1, thereby updating the player object position data Dj.

Then, in a horizontally-held operation method using either controller, then based on the moving direction and the movement algorithm of the first object G1, the CPU 81 continues the movement of the first object G1 until the first object G1 returns to the movement start position. For example, with reference to the player object position data Dj, the CPU 81 acquires the position and the moving direction of the first object G1, and based on the moving direction and the movement algorithm, the CPU 81 causes the first object G1 to move from the position of the first object G1. Then, the CPU 81 updates the player object position data Dj using the position of the first object G1 after the movement. It should be noted that when the first object G1 is moving on the homeward path in the virtual space for returning to the movement start position, the CPU 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the CPU 81 performs a second object action process (step S193), and the processing proceeds to the next step. For example, based on the description of the operation correspondence table indicated by the operation correspondence table data Di, the CPU 81 sets the content of an instruction indicated by the operation data acquired in the above step S191, and in accordance with the set content of the instruction, the CPU 81 causes the second object G2 to perform an action, thereby updating the player object position data Dj.

For example, in the horizontally-held operation method using the left controller 3, when the operation data acquired in the above step S191 indicates a pressing operation on the down direction button 34, the CPU 81 starts the movement of the second object G2 from the movement start position in a predetermined direction, thereby updating the player object position data Dj. Further, when the operation data acquired in the above step S191 indicates a tilt operation on the analog stick 32, and if the second object G2 is moving away from the movement start position in the virtual game world, then in accordance with the direction in which the analog stick 32 is subjected to the tilt operation and the tilt angle, the CPU 81 changes the moving direction or the moving velocity of the second object G2, thereby updating the player object position data Dj.

Further, in the horizontally-held operation method using the right controller 4, when the operation data acquired in the above step S191 indicates a pressing operation on the X-button 55, the CPU 81 starts the movement of the second object G2 from the movement start position in a predetermined direction, thereby updating the player object position data Dj. Further, when the operation data acquired in the above step S191 indicates a tilt operation on the analog stick 52, and if the second object G2 is moving away from the movement start position in the virtual game world, then in accordance with the direction in which the analog stick 52 is subjected to the tilt operation and the tilt angle, the CPU 81 changes the moving direction or the moving velocity of the second object G2, thereby updating the player object position data Dj.

Then, in a horizontally-held operation method using either controller, then based on the moving direction and the movement algorithm of the second object G2, the CPU 81 continues the movement of the second object G2 until the second object G2 returns to the movement start position. For example, with reference to the player object position data Dj, the CPU 81 acquires the position and the moving direction of the second object G2, and based on the moving direction and the movement algorithm, the CPU 81 causes the second object G2 to move from the position of the second object G2. Then, the CPU 81 updates the player object position data Dj using the position of the second object G2 after the movement. It should be noted that when the second object G2 is moving on the homeward path in the virtual space for returning to the movement start position, the CPU 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the CPU 81 performs a player object action process (step S194), and the processing proceeds to the next step. For example, based on the description of the operation correspondence table indicated by the operation correspondence table data Di, the CPU 81 sets the content of an instruction indicated by the operation data acquired in the above step S191, and in accordance with the set content of the instruction, the CPU 81 causes the player object PO to perform an action, thereby updating the player object position data Dj.

That is, in the horizontally-held operation method using the left controller 3, then with reference to the operation data Da, when the analog stick 32 is subjected to a tilt operation in the positive y-axis direction, the CPU 81 causes the player object PO to move to the left at a moving velocity corresponding to the tilt angle, thereby updating the player object position data Dj. With reference to the operation data Da, the analog stick 32 is subjected to a tilt operation in the negative y-axis direction, the CPU 81 causes the player object PO to move to the right at a moving velocity corresponding to the tilt angle, thereby updating the player object position data Dj. With reference to the operation data Da, when the analog stick 32 is subjected to a tilt operation in the negative x-axis direction, the CPU 81 causes the player object PO to move forward at a moving velocity corresponding to the tilt angle, thereby updating the player object position data Dj. With reference to the operation data Da, when the analog stick 32 is subjected to a tilt operation in the positive x-axis direction, the CPU 81 causes the player object PO to move backward at a moving velocity corresponding to the tilt angle, thereby updating the player object position data Dj. Then, with reference to the operation data Da, when the operation of pushing in the analog stick 32 is performed, and if the first object G1 and the second object G2 are placed at the movement start positions, the CPU 81 causes the player object PO to perform a defense action. Further, with reference to the operation data Da, when the up direction button 35 is pressed, the CPU 81 causes the player object PO to move dashing, thereby updating the player object position data Dj. Further, with reference to the operation data Da, when the right direction button 33 is pressed, the CPU 81 causes the player object PO to jump, thereby updating the player object position data Dj.

Further, in the horizontally-held operation method using the right controller 4, then with reference to the operation data Da, when the analog stick 52 is subjected to a tilt operation in the negative y-axis direction, the CPU 81 causes the player object PO to move to the left at a moving velocity corresponding to the tilt angle, thereby updating the player object position data Dj. With reference to the operation data Da, when the analog stick 52 is subjected to a tilt operation in the positive y-axis direction, the CPU 81 causes the player object PO to move to the right at a moving velocity corresponding to the tilt angle, thereby updating the player object position data Dj. With reference to the operation data Da, when the analog stick 52 is subjected to a tilt operation in the positive x-axis direction, the CPU 81 causes the player object PO to move forward at a moving velocity corresponding to the tilt angle, thereby updating the player object position data Dj. With reference to the operation data Da, when the analog stick 52 is subjected to a tilt operation in the negative x-axis direction, the CPU 81 causes the player object PO to move backward at a moving velocity corresponding to the tilt angle, thereby updating the player object position data Dj. Then, with reference to the operation data Da, when the operation of pushing in the analog stick 52 is performed, and if the first object G1 and the second object G2 are placed at the movement start positions, the CPU 81 causes the player object PO to perform a defense action. Further, with reference to the operation data Da, when the B-button 54 is pressed, the CPU 81 causes the player object PO to move dashing, thereby updating the player object position data Dj. Further, with reference to the operation data Da, when the Y-button 56 is pressed, the CPU 81 causes the player object PO to jump, thereby updating the player object position data Dj.

Next, the CPU 81 performs the process of generating vibration data for vibrating the left controller 3 (step S195), and the processing proceeds to the next step. It should be noted that the vibration data generation process in the above step S195 is similar to the vibration data generation process in above step S168, and therefore is not described in detail here.

Next, the CPU 81 performs the process of generating vibration data for vibrating the right controller 4 (step S196), and the processing proceeds to the next step. It should be noted that the vibration data generation process in the above step S196 is similar to the vibration data generation process in above step S169, and therefore is not described in detail here.

Next, the CPU 81 performs a vibration combining process (step S197), and the processing proceeds to the next step. For example, based on the left controller vibration data Df generated and updated in the above step S195 and the right controller vibration data Dg generated and updated in the above step S196, the CPU 81 generates combined vibration data for vibrating a single controller and updates the combined vibration data Dh using the generated data. Specifically, by the above selection method, the above addition method, or the like, the CPU 81 combines a vibration waveform indicated by the left controller vibration data Df (a vibration waveform for the left controller) and a vibration waveform indicated by the right controller vibration data Dg (a vibration waveform for the right controller) and updates the combined vibration data Dh using the combined vibration waveform.

Next, the CPU 81 performs the process of, in each cycle of transmitting vibration data, transmitting vibration data corresponding to this cycle to the left controller 3 or the right controller 4 set as the controller for use in the horizontally-held operation method (step S198), and the processing of this subroutine ends. For example, with reference to the combined vibration data Dh, the CPU 81 transmits vibration data for a vibration length corresponding to the transmission cycle to the left controller 3 or the right controller 4. The combined vibration data for vibrating a single controller is thus transmitted, whereby the left controller 3 or the right controller 4 receiving the combined vibration data vibrates based on a vibration waveform corresponding to the combined vibration data.

Referring back to FIG. 24, in step S150, the CPU 81 performs a display control process, and the processing proceeds to the next step. For example, the CPU 81 places the player object PO, the first object G1, the second object G2, and the enemy object EO on the game field using the player object position data Dj and the enemy object position data Dk. Then, the CPU 81 performs the process of generating a virtual space image in which the game field is viewed from a virtual camera placed at a predetermined position (e.g., behind the player object PO), and displaying the virtual space image on a display screen of a display device (e.g., the stationary monitor 6).

Next, the CPU 81 determines whether or not the game is to be ended (step S151). In the above step S151, examples of a condition for ending the game include: the fact that the result of the above game is settled; and the fact that the user performs the operation of ending the game. If the game is not to be ended, the processing returns to the above step S145, and the process of step S145 is repeated. If the game is to be ended, the processing of the flow chart ends. Hereinafter, the series of processes of steps S145 to S151 are repeatedly executed until it is determined in step S151 that the game is to be ended.

As described above, in the exemplary embodiment, when an operation is performed using both the left controller 3 and the right controller 4 (the vertically-held operation method or the extension grip operation method), each controller can be vibrated based on a different vibration waveform. Thus, it is possible to impart an appropriate vibration corresponding to each controller and enable realistic game play. On the other hand, when the same game is operated using one of the left controller 3 and the right controller 4 (the horizontally-held operation method), a vibration waveform for a single controller is generated based on the vibration waveform of a vibration to be imparted to each of the two controllers, and vibration data indicating the vibration waveform is transmitted to the one controller. Thus, even when one of the left controller 3 and the right controller 4 is operated, it is possible to impart a vibration based on the same vibration data as that of a vibration imparted to the two controllers. Thus, even if the operation method is changed, it is possible to impart an appropriate vibration and enable realistic game play.

It should be noted that in the above exemplary embodiment, an example has been used where an operation method is selected and set before a game is started. Alternatively, an operation method may be able to be changed even during a game. As an example, an operation method may be configured to be switched in accordance with the fact that a specific operation set for each of the plurality of operation methods described above is performed during a game. As another example, an operation method may be configured to be switched in accordance with the fact that a predetermined operation is performed to suspend a game by displaying options for the operation method, and an option is selected during the suspension of the game.

Further, in the above exemplary embodiment, the main body apparatus 2 performs the process of generating vibration data for a single controller based on vibration data for the left controller 3 and vibration data for the right controller 4. Alternatively, another apparatus may perform this process. For example, the process of generating the vibration data may be performed by the controller that is to vibrate using the vibration data for a single controller. In this case, the main body apparatus 2 transmits vibration data for the left controller 3 and vibration data for the right controller 4 to the target controller, whereby the process of generating vibration data for a single controller can be performed by the controller.

Further, in the above exemplary embodiment, some methods for generating vibration data for a single controller based on vibration data for the left controller 3 and vibration data for the right controller 4 have been exemplified. These methods may be fixed during a game, or may be changed during a game. In the second case, it is possible to, in accordance with the situation of the game, select an appropriate method, thereby generating vibration data for a single controller based on the vibration data for the left controller 3 and the vibration data for the right controller 4. For example, as described above, when vibration data for a single controller is generated by the selection method, it is possible to select a greater amplitude as a whole between a vibration waveform for the left controller and a vibration waveform for the right controller. Thus, it is possible to impart vibration stimulus to the user while maintaining the characteristics of the entirety of vibration waveforms to be input. On the other hand, when vibration data for a single controller is generated by the addition method, it is possible to cause the user to perceive vibrations overlapping each other without lacking vibrations. As described above, an appropriate generation method that matches the situation of the game is appropriately selected based on the advantage of a generation method, whereby it is possible to impart a more appropriate vibration.

Further, in the above exemplary embodiment, examples have been used where a single user performs game play using the left controller 3 and/or the right controller 4 by the vertically-held operation method, the extension grip operation method, and the horizontally-held operation method. Alternatively, it is also possible that a plurality of users perform game play. In this case, regarding the left controller 3 and/or the right controller 4 used by each of the users, a vibration corresponding to an operation method for which each of the users is set may be imparted to the controllers operated by each of the users.

Further, when a plurality of users use one of the left controller 3 and the right controller 4 by the horizontally-held operation method, it is also possible to impart the same vibration to the controller operated by each of the users. For example, an exemplary game is assumed where, when each of a plurality of users plays the same game by the vertically-held operation method or the extension grip operation method, the same vibration is imparted to the left controller 3 held by each of the users, and the same vibration is also imparted to the left controller 3 held by each of the users (e.g., a case where a vibration is imparted to each of the left controller 3 and the right controller 4 in conjunction with BGM or a sound effect reproduced in a game, a case where a plurality of users operate the same player object, or the like). When each of a plurality of users operates the above game by the horizontally-held operation method, a vibration waveform for the left controller 3 and a vibration waveform for the right controller 4 are the same for each user. Thus, the same vibration is imparted to the controller operated by each of the plurality of users.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. Further, in the above exemplary embodiment, a game image corresponding to an operation using the left controller 3 or the right controller 4 is displayed on the stationary monitor 6. Alternatively, the game image may be displayed on the display 12 of the main body apparatus 2. Further, a controller for controlling the actions of the first object G1 and/or the second object G2 may not only be a set of the left controller 3 and the right controller 4, but also be obtained by combining another controller with the left controller 3 and/or the right controller 4, or combining other controllers together.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the information processing system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the information processing system 1 performs information processing (game processing) and a communication process. Alternatively, another apparatus may perform at least some of the processing steps. For example, if the information processing system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the CPU 81 of the information processing system 1 executing a predetermined program. Alternatively, part or all of the processing of the flow charts may be performed by a dedicated circuit included in the information processing system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the information processing system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of, in a system where an operation can be performed using a plurality of operation apparatuses, imparting an appropriate vibration in accordance with the manner of using the operation apparatuses.

What is claimed is:

1. A non-transitory computer-readable storage medium having stored therein an information processing program executable by a computer included in an information processing apparatus configured to communicate with each of a first operation apparatus including a first vibrator and a second operation apparatus including a second vibrator, the information processing program, when executed, causing the computer to at least:
   operate in one of a first operation mode in which the first operation apparatus and the second operation apparatus are usable as a set by a player, and a second operation mode in which one of the first operation apparatus and the second operation apparatus is usable individually by the player;
   generate first and second vibration data;
   transmit the first vibration data to the first operation apparatus to cause the first operation apparatus to vibrate in accordance with the first vibration data and transmit the second vibration data to the second operation apparatus to cause the second operation apparatus to vibrate in accordance with the second vibration data, provided that the computer is being caused to operate in the first operation mode; and
   transmit third vibration data to the one of the first operation apparatus and the second operation apparatus that is being used individually to cause the one of the first operation apparatus and the second operation apparatus that is being used individually to vibrate in accordance with the third vibration data, provided that the computer is being caused to operate in the second operation mode, wherein the third vibration data is generated based on the first and second vibration data.

2. The non-transitory computer-readable storage medium having stored therein the information processing program according to claim 1, wherein in the generation of the first and second vibration data, when the computer is being caused to operate in the second operation mode, the greater of an amplitude of a first vibration waveform based on the first vibration data and an amplitude of a second vibration waveform based on the second vibration data is selected every predetermined time, and the selected vibration data is generated as the third vibration data.

3. The non-transitory computer-readable storage medium having stored therein the information processing program according to claim 1, wherein in the generation of the first and second vibration data, when the computer is being caused to operate in the second operation mode, the third vibration data is generated by superimposing a first vibration waveform based on the first vibration data and a second vibration waveform based on the second vibration data on each other.

4. The non-transitory computer-readable storage medium having stored therein the information processing program according to claim 1, the information processing program, when executed, further causing the computer to at least:
   receive, from the first operation apparatus, first operation data corresponding to a first operation on the first operation apparatus and second operation data corresponding to a second operation different from the first operation;

when the computer is being caused to operate in the first operation mode, perform information processing in accordance with the first operation data; and when the computer is being caused to operate in the second operation mode and the first operation apparatus is being used individually by the player, perform the same information processing in accordance with the second operation data.

5. The non-transitory computer-readable storage medium having stored therein the information processing program according to claim 4, wherein in the performance of the information processing, while an application is executed, the information processing is performed in accordance with the first operation data when the computer is being caused to operate in the first operation mode, and the same information processing is performed in accordance with the second operation data when the computer is being caused to operate in the second operation mode and the first operation apparatus is being used individually by the player.

6. The non-transitory computer-readable storage medium having stored therein the information processing program according to claim 4, wherein the information processing includes game processing.

7. The non-transitory computer-readable storage medium having stored therein the information processing program according to claim 6, wherein one of the first and second operation modes is set before a game in the game processing is started.

8. The non-transitory computer-readable storage medium having stored therein the information processing program according to claim 6, wherein the first operation apparatus and the second operation apparatus are usable as a set by the player when completely physically disconnected from one another, when the computer is being caused to operate in the first operation mode.

9. The non-transitory computer-readable storage medium having stored therein the information processing program according to claim 6, wherein the first operation apparatus and the second operation apparatus are usable as a set by the player when indirectly physically connected to one another, when the computer is being caused to operate in the first operation mode.

10. The non-transitory computer-readable storage medium having stored therein the information processing program according to claim 1, the information processing program, when executed, further causing the computer to at least:

receive, from the first operation apparatus, first operation data corresponding to a first operation on the first operation apparatus and second operation data corresponding to a second operation different from the first operation, and receive, from the second operation apparatus, third operation data corresponding to a third operation on the second operation apparatus;

when the computer is being caused to operate in the first operation mode, perform information processing in accordance with the first operation data and the third operation data; and when the computer is being caused to operate in the second operation mode and the first operation apparatus is being used individually by the player, perform the same information processing in accordance with the second operation data.

11. The non-transitory computer-readable storage medium having stored therein the information processing program according to claim 1, the information processing program, when executed, further causing the computer to at least:

receive, from the first operation apparatus, first operation data corresponding to a first operation on the first operation apparatus; and when the computer is being caused to operate in the first operation mode, perform information processing in accordance with the first operation data; and when the computer is being caused to operate in the second operation mode and the first operation apparatus is being used individually by the player, perform different information processing in accordance with the first operation data.

12. An information processing apparatus configured to communicate with each of a first operation apparatus including a first vibrator and a second operation apparatus including a second vibrator, the information processing apparatus comprising a computer processor configured to at least:

operate in one of a first operation mode in which first operation apparatus and the second operation apparatus are usable as a set by a player, and a second operation mode in which one of the first operation apparatus and the second operation apparatus is usable individually by the player;

generate first and second vibration data;

transmit the first vibration data to the first operation apparatus to cause the first operation apparatus to vibrate in accordance with the first vibration data and also transmit the second vibration data to the second operation apparatus to cause the second operation apparatus to vibrate in accordance with the second vibration data, provided that the computer is being caused to operate in the first operation mode; and transmit third vibration data to the one of the first operation apparatus and the second operation apparatus that is being used individually to cause the one of the first operation apparatus and the second operation apparatus that is being used individually to vibrate in accordance with the third vibration data, provided that the computer is being caused to operate in the second operation mode, wherein the third vibration data is generated based on the first and second vibration data.

13. An information processing system including a first operation apparatus including a first vibrator, a second operation apparatus including a second vibrator, and an information processing apparatus configured to communicate with each of the first operation apparatus and the second operation apparatus, the information processing apparatus comprising a computer processor configured to at least:

operate in one of a first operation mode in which the first operation apparatus and the second operation apparatus are usable as a set by a player, and a second operation mode in which one of the first operation apparatus and the second operation apparatus is usable individually by the player;

generate first and second vibration data;

transmit the first vibration data to the first operation apparatus to cause the first operation apparatus to vibrate in accordance with the first vibration data and also transmit the second vibration data to the second operation apparatus to cause the second operation apparatus to vibrate in accordance with the second vibration data, provided that the computer is being caused to operate in the first operation mode; and transmit third vibration data to the one of the first operation apparatus and the second operation apparatus that is being used individually to cause the one of the first operation apparatus and the second operation apparatus that is being used individually to vibrate in accordance with the third vibration data, provided that the computer is being caused to operate in the second operation mode, wherein the third vibration data is generated based on the first and second vibration data.

14. The information processing system according to claim 13, wherein in the generation of the first and second vibration data, when the computer processor is being caused to operate in the second operation mode, the greater of an amplitude of a first vibration waveform based on the first vibration data and an amplitude of a second vibration waveform based on the second vibration data is selected every predetermined time, and the selected vibration data is generated as the third vibration data.

15. The information processing system according to claim 13, wherein in the generation of the first and second vibration data, when the computer processor is being caused to operate in the second operation mode, the third vibration data is generated by superimposing a first vibration waveform based on the first vibration data and a second vibration waveform based on the second vibration data on each other.

16. The information processing system according to claim 13, wherein the computer processor is further configured to at least:
receive, from the first operation apparatus, first operation data corresponding to a first operation on the first operation apparatus and second operation data corresponding to a second operation different from the first operation;
when the computer processor is being caused to operate in the first operation mode, perform information processing in accordance with the first operation data; and
when the computer processor is being caused to operate in the second operation mode and the first operation apparatus is being used individually by the player, perform the same information processing in accordance with the second operation data.

17. An information processing method for use with a first operation apparatus including a first vibrator and a second operation apparatus including a second vibrator, the method comprising:
operating in one of a first operation mode in which the first operation apparatus and the second operation apparatus are usable as a set by a player, and a second operation mode in which one of the first operation apparatus and the second operation apparatus is usable individually by the player;
transmitting the first vibration data to the first operation apparatus to cause the first operation apparatus to vibrate in accordance with the first vibration data and transmitting the second vibration data to the second operation apparatus to cause the second operation apparatus to vibrate in accordance with the second vibration data, provided that operation is in the first operation mode; and
transmitting third vibration data to the one of the first operation apparatus and the second operation apparatus that is being used individually to cause the one of the first operation apparatus and the second operation apparatus that is being used individually to vibrate in accordance with the third vibration data, provided that operation is in the second operation mode, wherein the third vibration data is generated based on the first and second vibration data.

18. The method according to claim 17, wherein in the generation of the first and second vibration data, when operation is in the second operation mode, the greater of an amplitude of a first vibration waveform based on the first vibration data and an amplitude of a second vibration waveform based on the second vibration data is selected every predetermined time, and the selected vibration data is generated as the third vibration data.

19. The method according to claim 17, wherein in the generation of the first and second vibration data, when operation is in the second operation mode, the third vibration data is generated by superimposing a first vibration waveform based on the first vibration data and a second vibration waveform based on the second vibration data on each other.

20. The method according to claim 17, further comprising:
receiving, from the first operation apparatus, first operation data corresponding to a first operation on the first operation apparatus and second operation data corresponding to a second operation different from the first operation;
when operation is in the first operation mode, performing information processing in accordance with the first operation data; and
when operation is in the second operation mode and the first operation apparatus is being used individually by the player, performing the same information processing in accordance with the second operation data.

* * * * *